US010367270B2

(12) United States Patent
Breed et al.

(10) Patent No.: US 10,367,270 B2
(45) Date of Patent: Jul. 30, 2019

(54) VEHICLE WIRE HARNESS

(71) Applicant: Intelligent Technologies International, Inc., Miami Beach, FL (US)

(72) Inventors: David S Breed, Miami Beach, FL (US); Wendell C Johnson, San Pedro, CA (US); Wilbur E DuVall, Katy, TX (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 337 days.

(21) Appl. No.: 15/167,037

(22) Filed: May 27, 2016

(65) Prior Publication Data
US 2016/0347269 A1    Dec. 1, 2016

Related U.S. Application Data

(60) Provisional application No. 62/167,051, filed on May 27, 2015.

(51) Int. Cl.
*H04B 3/56* (2006.01)
*H01R 4/2416* (2018.01)
*B60R 16/02* (2006.01)

(52) U.S. Cl.
CPC ....... *H01R 4/2416* (2013.01); *B60R 16/0207* (2013.01); *B60R 16/0215* (2013.01); *H04B 3/56* (2013.01)

(58) Field of Classification Search
CPC ....... B60R 16/02; B60R 16/023; B60R 16/03; H01R 13/52; H01R 4/24; H04B 3/56
See application file for complete search history.

(56) References Cited

U.S. PATENT DOCUMENTS

| 5,282,129 A | 1/1994 | Losic et al. |
| 5,613,857 A | 3/1997 | Kawamura et al. |
| 5,623,169 A | 4/1997 | Sugimoto et al. |
| 5,821,632 A | 10/1998 | Normann et al. |

(Continued)

FOREIGN PATENT DOCUMENTS

| WO | 2003048829 A2 | 6/2003 |
| WO | 2004054179 A1 | 6/2004 |

OTHER PUBLICATIONS

International Search Report and Written Opinion for PCT/US2016/034593 dated Sep. 20, 2016.

*Primary Examiner* — Rexford N Barnie
*Assistant Examiner* — Elim Ortiz
(74) *Attorney, Agent, or Firm* — Brian Roffe

(57) ABSTRACT

Electrical system for a vehicle that provides power and communications to vehicular devices includes a (singular) electrical bus having elongate wires, and connector assemblies situated at different locations along the wires. The connector assemblies include a splice housing defining an inlet and outlet for the wires, the wires passing from the inlet to the outlet through the splice housing without being interrupted, and a connector attached to the splice housing. An electrical conduit, such as one or more wires, is attached at one end region to each connector and at an opposite end region to a respective cluster or cluster control unit. Each cluster or cluster control unit is electrically coupled to at least one vehicular device. Power and communications are provided to the vehicular devices by a power source and communications source through the bus.

20 Claims, 18 Drawing Sheets

(56) References Cited

U.S. PATENT DOCUMENTS

| | | |
|---|---|---|
| 5,995,380 A | 11/1999 | Maue et al. |
| 6,182,607 B1 | 2/2001 | Dumas et al. |
| 6,189,057 B1 | 2/2001 | Schwanz et al. |
| 6,203,343 B1 | 3/2001 | Chevassus-More et al. |
| 6,218,740 B1 | 4/2001 | Mildice |
| 6,246,001 B1 | 6/2001 | Fukui |
| 6,249,060 B1 | 6/2001 | Osha |
| 6,256,557 B1 | 7/2001 | Avila et al. |
| 6,291,770 B1 | 9/2001 | Casperson |
| 6,326,704 B1 | 12/2001 | Breed et al. |
| 6,392,148 B1 | 5/2002 | Ueno et al. |
| 6,411,866 B1 | 6/2002 | Cavanaugh |
| 6,469,404 B1 | 10/2002 | Pohjola |
| 6,472,770 B1 | 10/2002 | Pohjola |
| 6,503,098 B2 | 1/2003 | Aoki et al. |
| 6,600,236 B2 | 7/2003 | Rhodes |
| 6,616,463 B1 | 9/2003 | Burnett et al. |
| 6,635,824 B1 | 10/2003 | Oka |
| 6,684,973 B2 | 2/2004 | Baba et al. |
| 6,960,841 B2 | 11/2005 | Saiton et al. |
| 6,963,146 B2 | 11/2005 | Zecca et al. |
| 6,970,772 B2 | 11/2005 | Radtke et al. |
| 6,982,648 B2 | 1/2006 | Cros et al. |
| 6,999,855 B2 | 2/2006 | Sakurai et al. |
| 7,079,450 B2 | 7/2006 | Breed et al. |
| 7,089,099 B2 | 8/2006 | Shostak et al. |
| 7,112,745 B2 | 9/2006 | Hatori |
| 7,132,761 B2 | 11/2006 | Rhodes |
| 7,265,998 B2 | 9/2007 | Suzuki et al. |
| 7,304,567 B2 | 12/2007 | Canfield |
| 7,354,280 B2 | 4/2008 | Gordon et al. |
| 7,423,519 B2 | 9/2008 | Yanagida et al. |
| 7,460,934 B2 | 12/2008 | Yanagida et al. |
| 7,467,034 B2 | 12/2008 | Breed et al. |
| 7,509,176 B2 | 3/2009 | Chen |
| 7,663,502 B2 | 2/2010 | Breed |
| 7,724,778 B2 | 5/2010 | Ying |
| 7,760,080 B2 | 7/2010 | Breed et al. |
| 7,786,864 B1 | 8/2010 | Shostak et al. |
| 7,852,206 B2 | 12/2010 | Yanagida et al. |
| 7,880,594 B2 | 2/2011 | Breed et al. |
| 7,889,096 B2 | 2/2011 | Breed |
| 7,920,102 B2 | 4/2011 | Breed |
| 7,940,673 B2 | 5/2011 | Ballard et al. |
| 7,957,868 B2 | 6/2011 | Warner et al. |
| 7,983,050 B2 | 7/2011 | Graynier et al. |
| 7,999,408 B2 | 8/2011 | Fehr et al. |
| 8,032,264 B2 | 10/2011 | Breed |
| 8,057,262 B2 | 11/2011 | Oakes |
| 8,068,942 B2 | 11/2011 | Breed |
| 8,089,345 B2 | 1/2012 | Berglund et al. |
| 8,154,150 B2 | 4/2012 | Sakai et al. |
| 8,170,744 B2 | 5/2012 | Nagasawa et al. |
| 8,303,337 B2 | 11/2012 | Ballard et al. |
| 8,367,927 B2 | 2/2013 | Sawamura |
| 8,384,238 B2 | 2/2013 | Yoshida et al. |
| 8,400,061 B2 | 3/2013 | Kuang et al. |
| 8,477,501 B2 | 7/2013 | Ying |
| 8,725,311 B1 | 5/2014 | Breed |
| 8,917,781 B2 | 12/2014 | Murase et al. |
| 8,917,782 B2 | 12/2014 | Wang et al. |
| 9,029,700 B2 | 5/2015 | Hara |
| 9,029,701 B2 | 5/2015 | Hara |
| 9,337,897 B2 | 5/2016 | Takata et al. |
| 9,509,456 B2 | 11/2016 | Ott et al. |
| 9,520,916 B2 | 12/2016 | Abe et al. |
| 2002/0167398 A1 | 11/2002 | Strasser |
| 2006/0244309 A1 | 11/2006 | Claussen et al. |
| 2007/0267212 A1 | 11/2007 | Nachbauer et al. |
| 2009/0314511 A1 | 12/2009 | Hagi et al. |
| 2012/0330597 A1* | 12/2012 | Lammers ............... B60R 16/03 702/122 |
| 2013/0273873 A1 | 10/2013 | Gerdes |
| 2014/0111963 A1 | 4/2014 | Satake et al. |
| 2014/0153655 A1 | 6/2014 | Abe et al. |
| 2014/0309763 A1 | 10/2014 | Messenger |
| 2015/0129304 A1 | 5/2015 | Ramunno |
| 2015/0229115 A1 | 8/2015 | George et al. |
| 2015/0280372 A1* | 10/2015 | Huang ............... H01R 13/2421 439/581 |
| 2015/0349471 A1 | 12/2015 | Maki et al. |
| 2016/0036256 A1 | 2/2016 | Sukup et al. |
| 2016/0137148 A1 | 5/2016 | Breed et al. |

\* cited by examiner

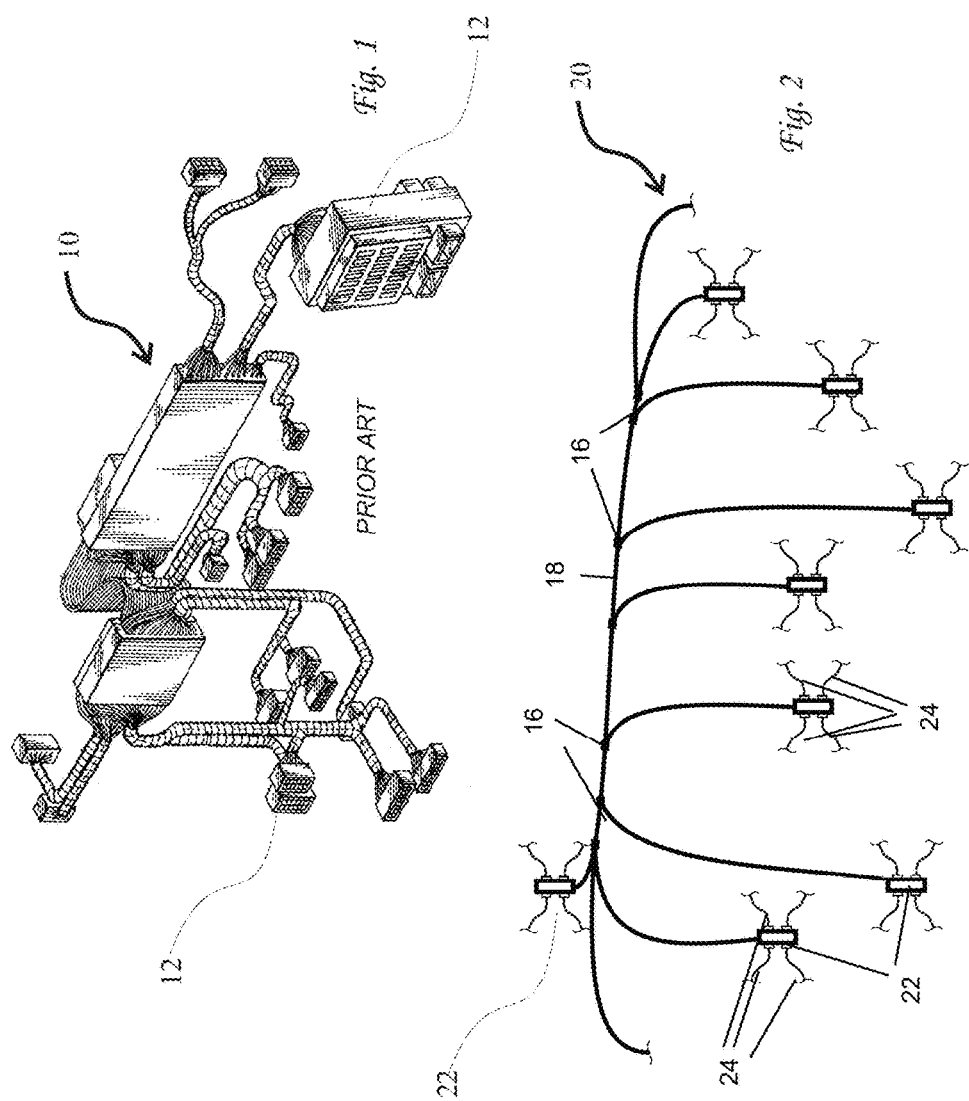

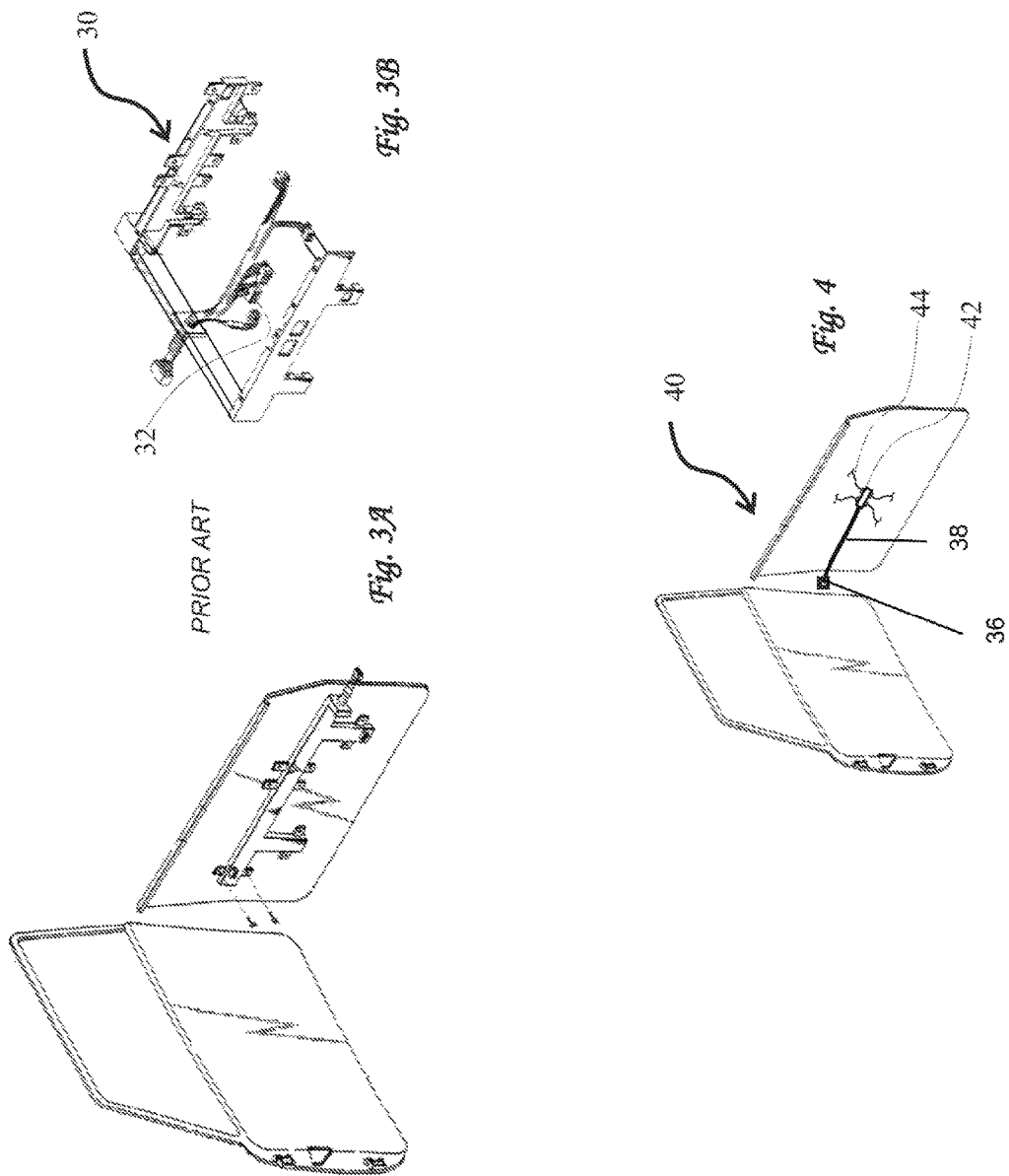

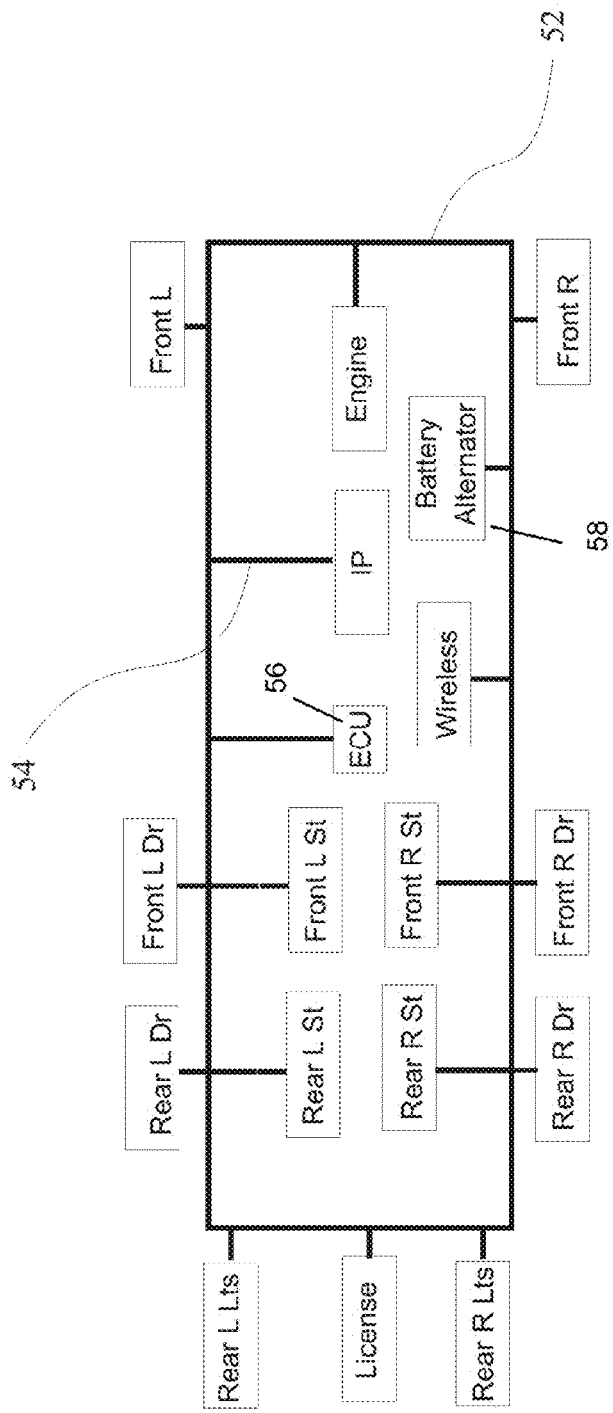

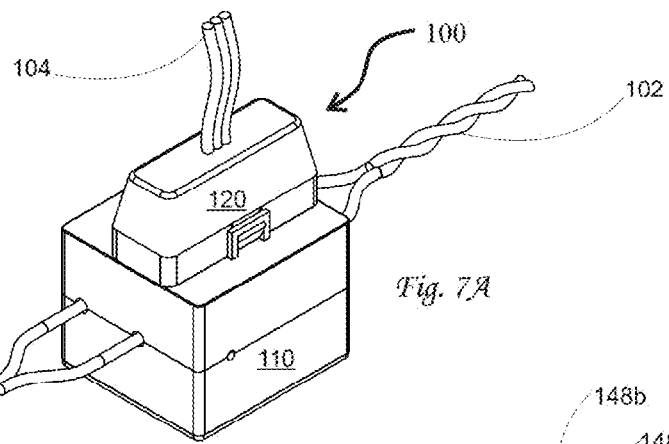
Fig. 7A
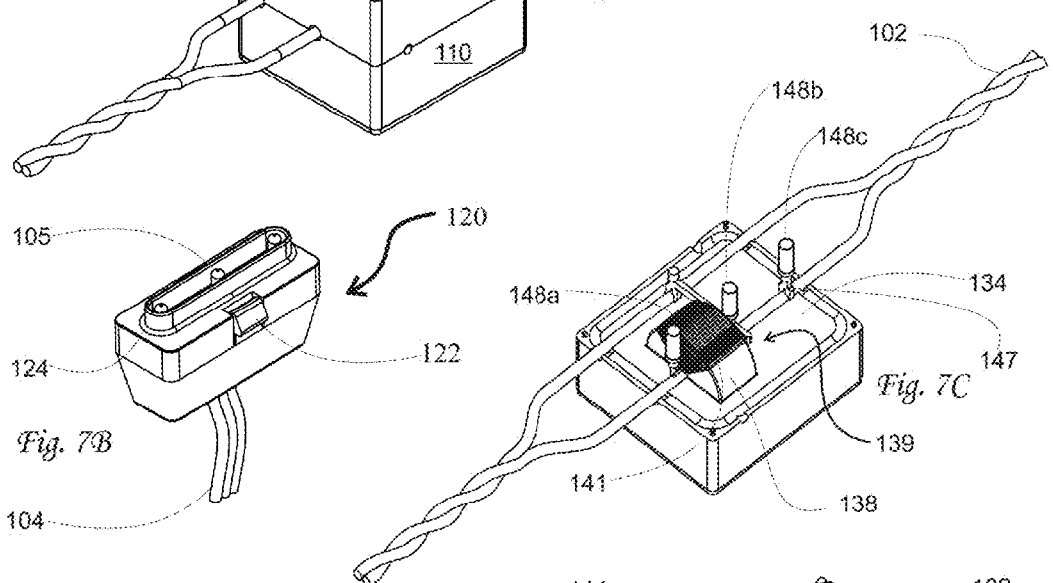
Fig. 7B
Fig. 7C
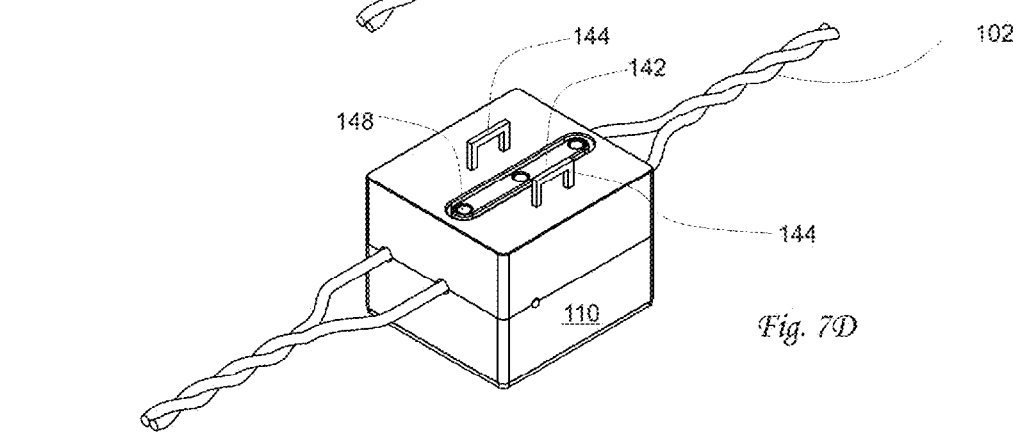
Fig. 7D

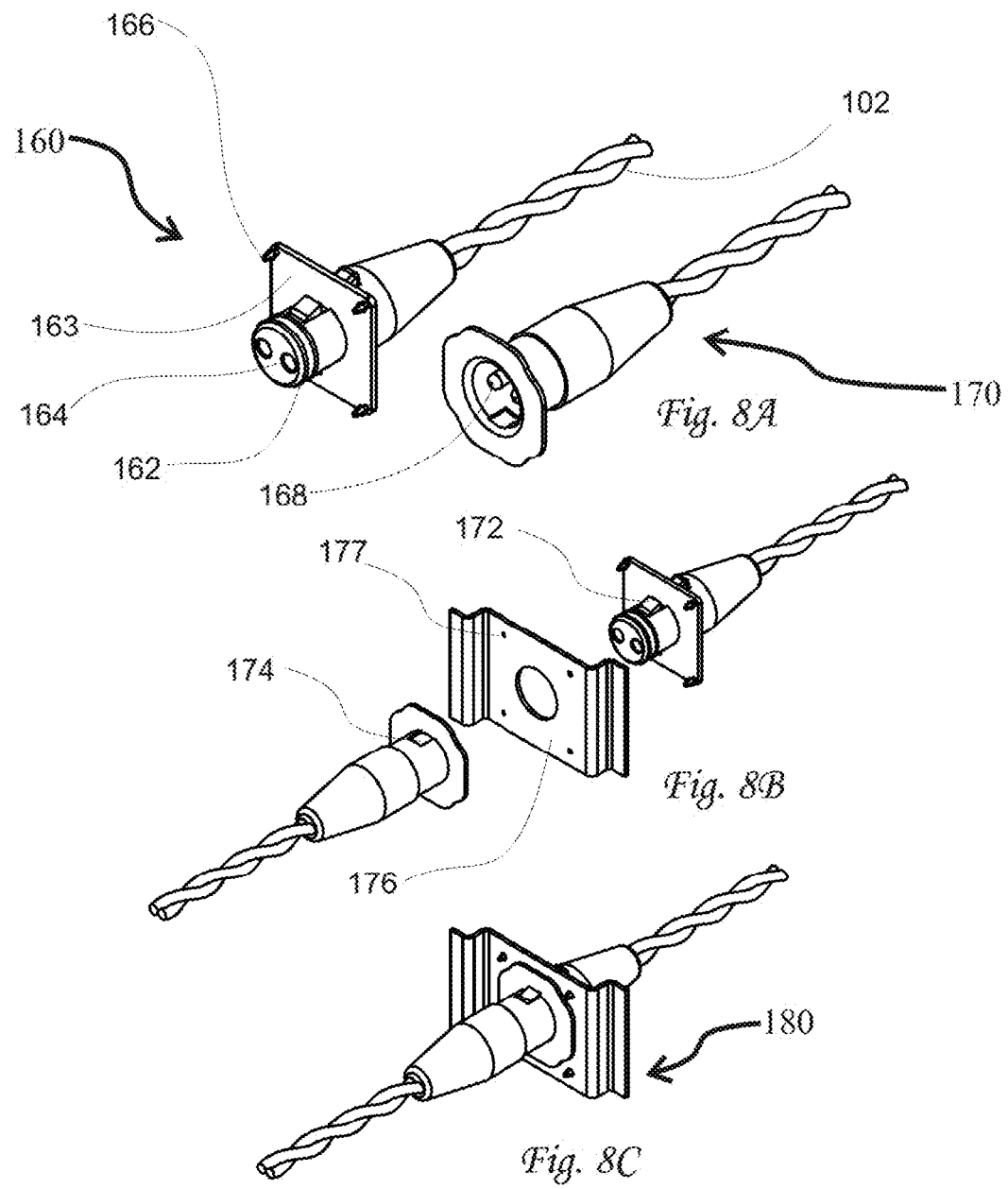

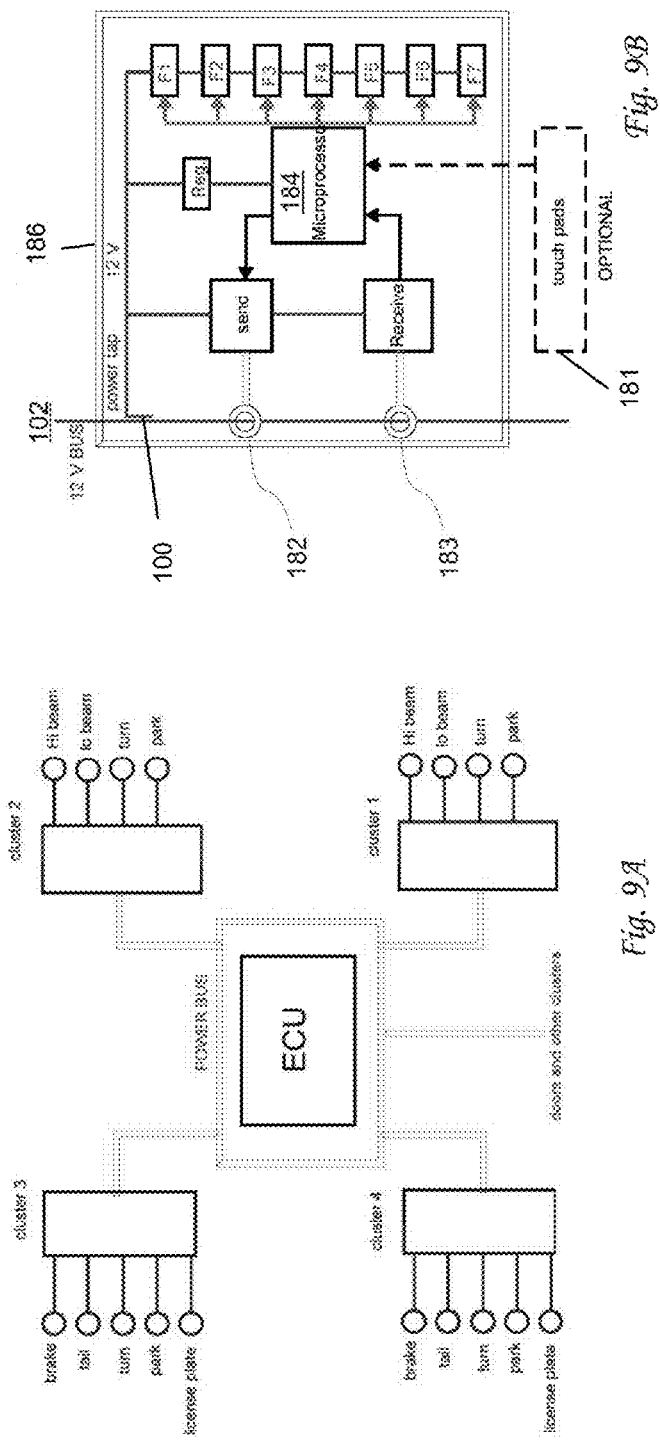
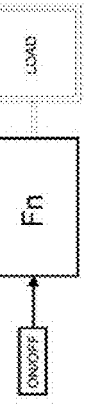
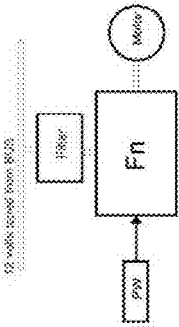

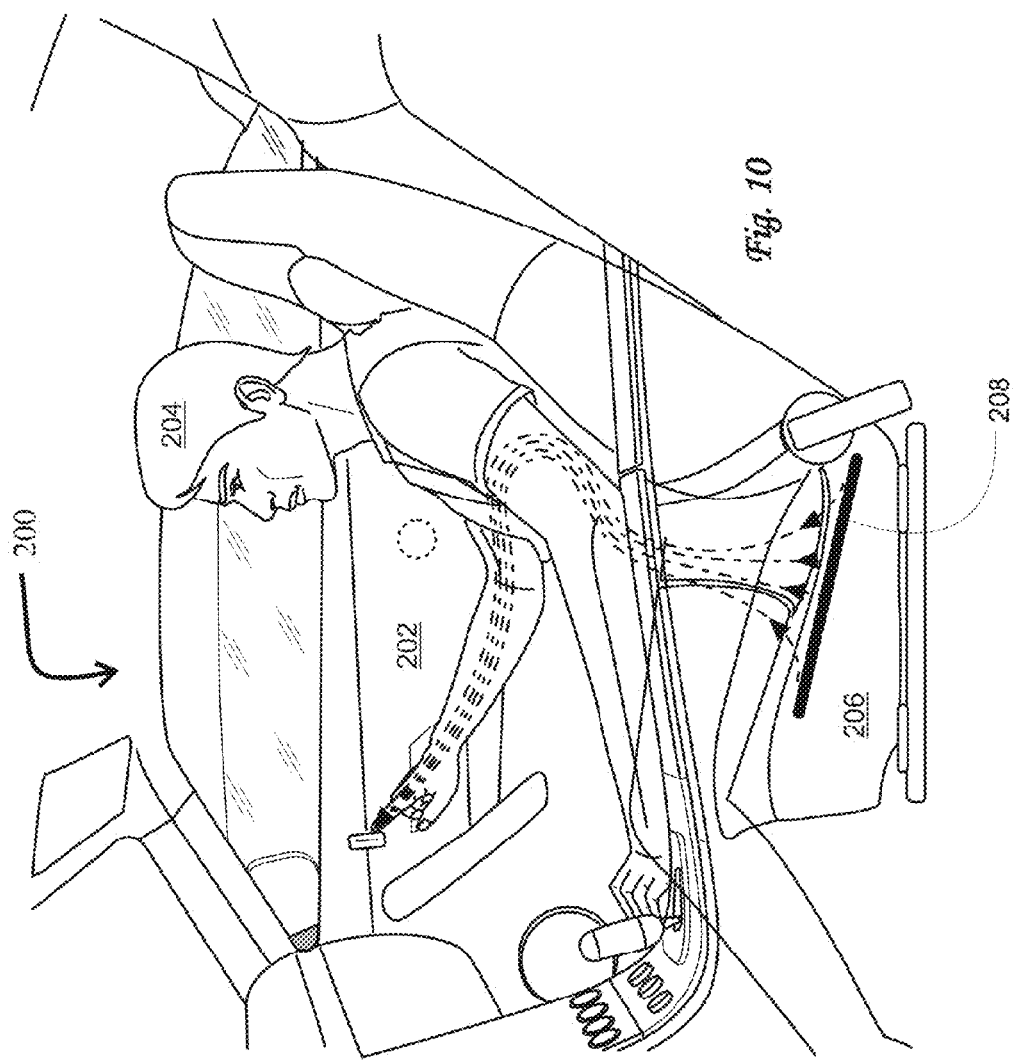

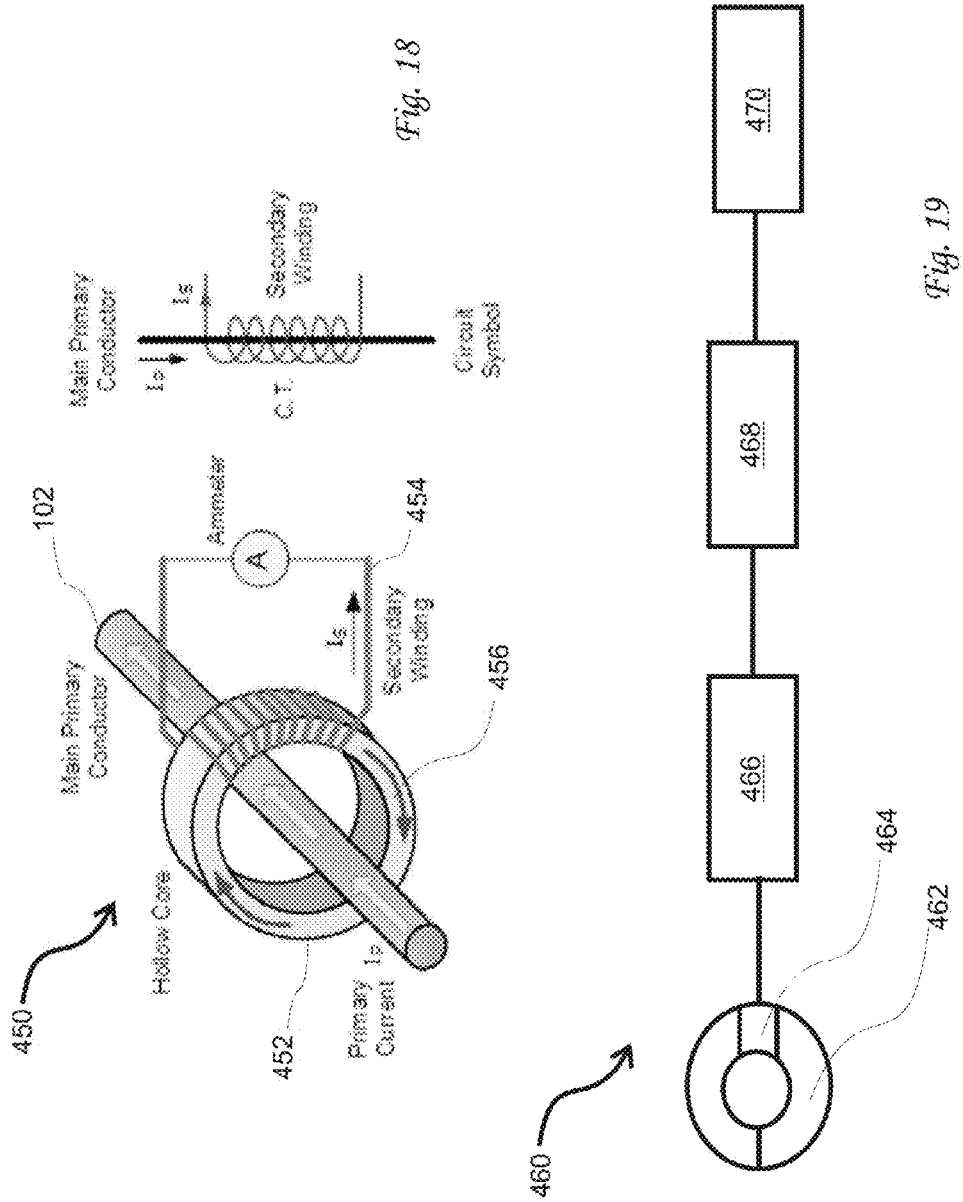

VEHICLE WIRE HARNESS

CROSS REFERENCE TO RELATED APPLICATION

This application claims priority of U.S. provisional patent application Ser. No. 62/167,051 filed May 27, 2015, which is incorporated by reference herein.

FIELD OF THE INVENTION

This invention is in the general field of wiring systems applied to vehicles and particularly to motor vehicles such as automobiles. The present invention specifically addresses use of a common wire bus or data bus for supplying and receiving information and supplying power to a plurality of sensors and actuators in a motor vehicle.

BACKGROUND OF THE INVENTION

It is not uncommon for an automotive vehicle today to have many motors, other actuators, lights etc., controlled by one hundred or more switches and fifty or more relays and connected together by almost five hundred meters of wire, and close to one thousand pin connections grouped in various numbers into connectors. It is not surprising therefore that the vehicular electrical system is a highly unreliable system of the vehicle and a probable cause of most warranty repairs.

Unfortunately, the automobile industry is taking a piecemeal approach to solving this problem when a revolutionary approach is called for. Indeed, a current trend is to group several devices of the vehicle's electrical system together which are located geometrically or physically in the same area of the vehicle and connect them to a zone module which is then connected by communication and power buses to the remainder of the vehicle's electrical system. The resulting hybrid systems still contain substantially the same number and assortment of connectors with only about a 20% reduction in the amount of wire in the vehicle.

Possible definitions of terms used in the application are set forth in U.S. Pat. No. 7,663,502, incorporated by reference herein.

SUMMARY OF THE INVENTION

In one embodiment of a vehicle electrical wiring system in accordance with the invention, most if not all of the devices are connected together with a single communication bus and a single power bus. In a preferred embodiment, a single wire pair will serve as both the power and communication buses. When completely implemented, each device on the vehicle will be coupled to the power and communication buses, or single combined bus, so that they will now have an intelligent connection and respond only to data that is intended for that device, that is, only that data with the proper device address or identification (ID).

Thus, an electrical system for a vehicle that provides power and communications to a plurality of vehicular devices includes a (singular) electrical bus comprising plurality of elongate wires, and a plurality of connector assemblies situated at different locations along the wires. The connector assemblies include a splice housing defining an inlet for the wires and an outlet for the wires, the wires passing from the inlet to the outlet through the splice housing without being interrupted, and a connector attached to the splice housing. An electrical conduit is attached at one end region to each connector and at an opposite end region to a respective cluster or cluster control unit. Each cluster is electrically coupled to at least one vehicular device. Power and communications are provided to the vehicular devices by a power source and communications source connected to the bus.

The connectors each include one or more pins representing a male member of an electrical connection arrangement, and the electrical conduit includes at least one wire each electrically coupled to a respective pin. Moisture sealant means are arranged around the pins to protect the connector from moisture intrusion. Attachment means for attaching the connector to the splice housing are provided.

The splice housing includes electrical receptacles coupled to the wires, e.g., in contact with the wires or forming a toroid that passes around the wires, and that define apertures for receiving mating electrical pins, and thus representing a female member of the electrical connection arrangement which is configured to mate with the male connection arrangement, e.g., the pin. Variants of the receptacles are envisioned. In one variant, the receptacle includes a spring-loaded extension that directly engages with a central conductor in one wire and is situated above that wire. In another variant, the receptacle includes a spring-loaded extension that directly engages with a conductor in a first wire and an extension extends from this first wire to a second, spaced apart wire. The receptacle is situated above the second wire. In a third variant, a toroid is around one wire, a wire coil wraps around the toroid, and the receptacle is attached to the wire coil.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 1 is a perspective view of a prior art wire harness of a vehicle.

FIG. 2 is a view of a replacement wire harness system of FIG. 1 according to this invention.

FIG. 3A is a partially dissembled door containing a prior art door wire harness and FIG. 3B is an exploded view of the harness of FIG. 3A.

FIG. 4 is a view of a replacement wire harness system of FIGS. 3A and 3B according to this invention.

FIG. 5 is a block diagram of the power bus connected with various clusters.

FIG. 7A is a perspective view of the wire splice and connector assembly in accordance with the invention.

FIG. 7B shows a male connector with wires leading to a cluster.

FIG. 7C shows a section view of the assembly of FIG. 7A.

FIG. 7D shows the bottom half of the assembly of FIG. 7A.

FIGS. 8A, 8B and 8C illustrate the manner in which male and female connectors allow a bus to pass through a firewall.

FIGS. 9A, 9B, 9C, 9D, and 9E are schematic illustrations of a cluster controlling for devices.

FIG. 10 is a side view with parts cutaway and removed of a vehicle showing a passenger compartment containing a driver sitting on a vehicle seat which contains a single electric field antenna and the path of the energy from the antenna to an RFID switch in accordance with an embodiment of the invention.

FIG. 18 illustrates the connection of clusters onto the power bus using a toroid and including the electrical schematic.

FIG. 19 illustrates how a Hall Effect sensor can be used in place of a transformer.

DETAILED DESCRIPTION OF THE INVENTION

Figure 6:
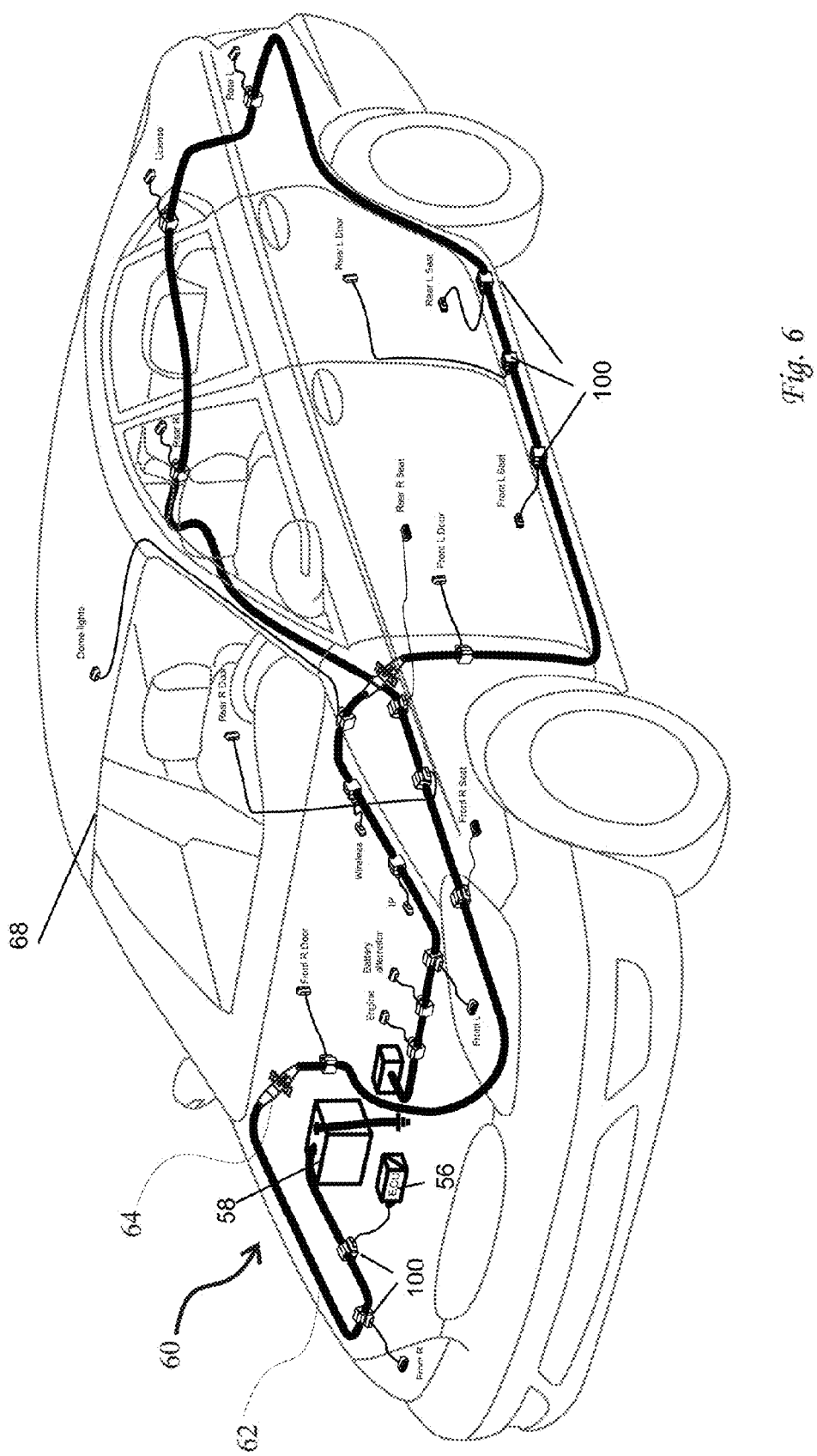
FIG. 6 is a drawing of the wire loop as it travels around the vehicle.

All patents or literature referred to anywhere in this specification are incorporated by reference in their entirety. Also, although many of the examples below relate to a particular vehicle, an automobile, the invention is not limited to any particular vehicle and is thus applicable to all relevant vehicles including all compartments of a vehicle including, for example, the passenger or other compartment of an automobile, truck, bus, farm tractor, construction machine, train, airplane and boat.

"Or" and "and" as used in the specification and claims shall be read in the conjunctive and in the disjunctive wherever they appear as necessary to make the text inclusive rather than exclusive, and neither of these words shall be interpreted to limit the scope of the text.

Referring now to the accompanying drawings, FIG. 1 is a perspective view showing a prior art wire bus or harness 10 of a vehicle presented to illustrate the complexity inherent in current wire harness. Connectors on the bus are illustrated at 12.

FIG. 2 is a view of a replacement for the wire harness system of FIG. 1 showing a wire harness system 20 according to this invention. Each connector 12 in the prior art wire harness system in FIG. 1 is replaced by a cluster 22 that leads from a respective one of a plurality of splice and connector assemblies 16 that engage with a power and communication bus 18 (also referred to as connector assemblies). Although shown here with four wires 24 leading from each cluster 22, the actual number of wires 24 leading from each cluster 22 depends on the number of devices which will be controlled by the cluster 22 (described in more detail below) and may vary from a minimum of one to a maximum determined by other requirements of the cluster 22, e.g., size. Each wire 24 can lead to a respective vehicular device (not shown in FIG. 2). It is understood by those skilled in the art that the power and communication bus 18 is connected to a power source and communications source, which are known in the art to which this invention pertains and configured to direct power and/or communications along or over the bus 18.

A cluster 22 may be considered for the purposes of this application as an electronic assembly comprising a small microprocessor corresponding to each of the devices being controlled by the cluster 22, or alternately one microprocessor for all of the devices connected to the cluster 22. A cluster microprocessor responds to the ID of the device which it controls and controls the device based on one or more commands attached to the ID message passing on the power and communication bus 18. In the case of a light, as an example of a vehicular device, the microprocessor provides power to the light when an "on" command is received. In the case of a window motor, as another example of a vehicular device, the microprocessor provides power to the window motor until it receives a command to stop. Many different processes can be controlled by the microprocessor as needed. The microprocessor can check for a shorted or open circuit prior to sending power to a device and if either condition is found, the microprocessor sends a fault message to the ECU thereby eliminating the need for all but a vehicle master fuse.

The power and communication bus 18 may be a two-wire bus and may be the only bus in the vehicle. This does not preclude the possibility of using two or more such bus in accordance with the invention in the same vehicle. The number of splice and connector assemblies 16 attached to the power and communication bus 18 depends on the number of clusters 22 needed.

FIG. 3A is a partially dissembled door containing a prior art door wire harness shown generally at 30 with one of several complex connectors shown at 32 and FIG. 3B is an exploded view of the harness 30 of FIG. 3A.

FIG. 4 is a view of a replacement for the wire harness system of FIGS. 3A and 3B shown generally at 40 with a cluster shown at 42 according to this invention. A representative two-conductor wire 38 is shown at 44 which can be connected to a device such as a window motor which requires power. Wire 38 leads from a splice and connector housing 36 that is attached to the power and communication bus (not shown in FIG. 4). As explained below, a microprocessor within the cluster 42 determines which wire 44 requires power and supplies the requisite wire 44 with the needed power to, for example, raise or lower a window. The wire 44 can be hard-wired into the window motor or connected to the motor via a simple 2-pin connector. Similarly, the wire 44 can be hard-wired into the cluster 42 or connected thereto by a connector (not shown). The simplest and most reliable approach is not to have connectors.

Figure 16:
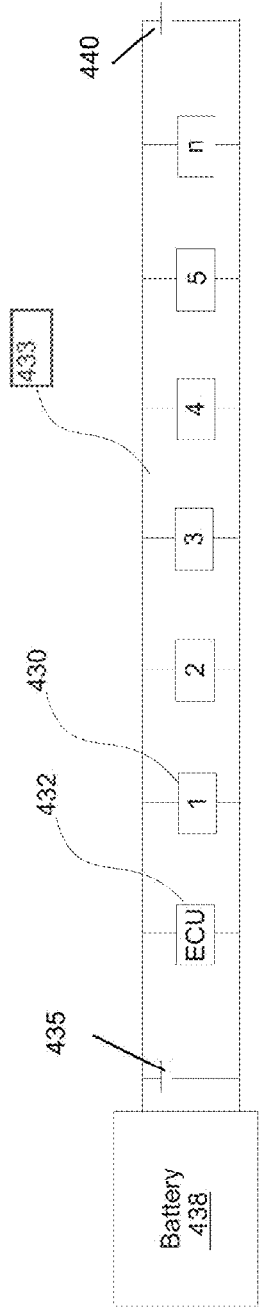
FIG. 16 is a block diagram of a power bus.
Figure 17:
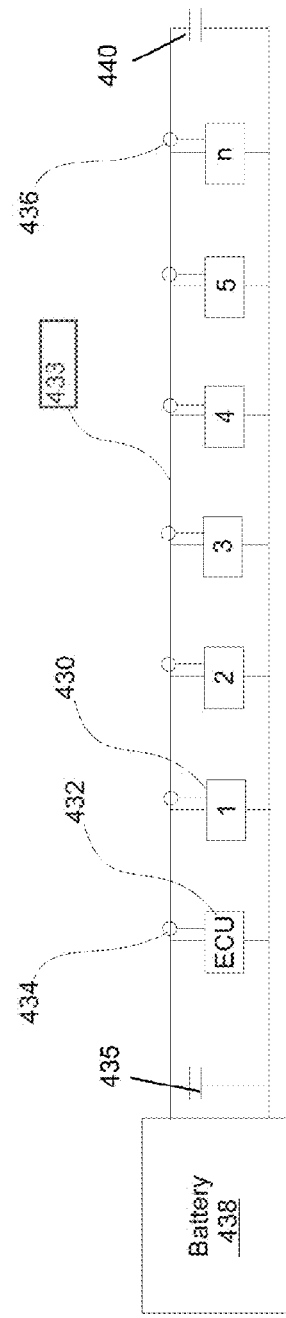
FIG. 17 is a block diagram of a power bus illustrating interaction with a component.

FIG. 5 is a block diagram showing the general layout in a vehicle of a two-wire power bus circuit design. The power bus is illustrated at 52 and the three wire connections to the clusters at 54. Each text-containing box, except the ECU 56 and battery 58, represents a cluster which services all of the devices in the front left door for example. The ECU 56 controls communication on the bus 52 by periodically polling all of the clusters which can be done is a small fraction of a second. If a cluster has a device which wishes to send a message to another device on the bus 52, when polled, it makes this request known to the ECU 56, which grants a time slot on the bus 52 for use by the device. ECU 56 may also be considered to represent a communications source. The battery 58 is at one end of the bus 52, or may be connected anywhere along the bus 52, and is considered to represent a power source. One or both ends of the bus 52 may be terminated by a capacitor (e.g., capacitor 440 as shown in FIGS. 16 and 17).

FIG. 6 shows a wire harness or loop 60 as it travels around the vehicle 68. Wire loop 60 includes a bus 62 and is unbroken except where it passes through the firewall where a firewall connector 64 and splice and connector assemblies 100 are used, described below (the firewall connector in FIGS. 8A-8C and the splice and connector assemblies in FIGS. 7A-7G).

A perspective view of a wire splice and connector assembly 100 is shown in FIG. 7A. Main power bus wires 102 enter and leave a splice housing 110 without being interrupted. The wires 102 may be those of the power and communication bus 18 in FIG. 2, the power bus in FIG. 5, or the bus 62 in FIG. 6. The splice housing 110 therefore defines an inlet for each of the wires 102 and an outlet for each of the wires 102 so that the wires 102 pass from the inlet to the outlet through the splice housing 110 without being interrupted, i.e., terminated. The wires 102 are, however, connected to another wire 104 through electrical receptacle connectors, as described below, without severing the bus wires 102. It is imperative to appreciate that by not being interrupted, it means that both of the bus wires 102 do not terminate in the splice housing 110, but rather, are continuous through the splice housing 110.

Splice housing 110 may be made of two parts as in the illustrated embodiment, each from dielectric, i.e., electrically insulative, material, and which are attached together to form an interior in which conduits for the wires 102 are provided, along with cavities for the electrical components that allow for transmission of power and/or communications from the wires 102 to an exposed electrically conductive material. This electrically conductive material in turn is connected to conductive pins on a connector 120.

The connector 120 connects with the splice housing 110 drawing power and data or information, as described below, which travels through a wire, e.g., a 3-conductor wire 104, to a cluster or cluster control unit, also described below. The connector 120 is shown separated from the splice housing 110 in FIG. 7B. An electrical conduit is attached at one end region to each connector 120 and more specifically, wires 104 are connected to pins 105 in connector 120, e.g., each wire 104 is electrically connected to a respective pin 105.

The wires and pin connectors 120 can be insert-molded in a fashion as to reduce or eliminate moisture permeating the connector 120 and/or the wires 104. Pins 105 may be elongate rigid members.

The cluster to which the end of the wires 104 is attached may be cluster 22 as in FIG. 2, cluster 42 in FIG. 4 and other clusters in the drawings. Generally, a respective cluster with a control unit (an ECU) is attached to an opposite end region of each set of wires 104, the wires being representative of an electrical conduit from the connector 120 attached to the splice housing 110. As used herein, an electrical conduit may be a single wire, multiple wires possibly twisted or connected together or a cable having a housing and one or more wires therein (e.g., an insulative casing around one or more wires). Other structure that serves to convey electrical power or signals between spaced apart locations (e.g., between the connector 102 and the cluster 22, 42, etc.) are also encompassed by the term electrical conduits as used herein. Each cluster is electrically coupled to at least one vehicular device, so that at least one of power and communications are provided to the vehicular devices through the bus, the connector assemblies, the electrical conduits leading from the connectors of the connector assemblies, and the cluster control units.

An O-ring type seal 124 is provided to further protect the connector from moisture intrusion (FIG. 7B). The O-ring seal 124 represents moisture sealant means arranged around the pins 105 to protect the connector 120 from moisture intrusion. Alternative sealant techniques and structure may be used in the invention instead of an O-ring including any sealant structure known to those in the art of electrical connectors. Sealant structure, whether currently known or developed in the future, that serves to protect the connector 120 from moisture intrusion and has structure similar or equivalent to the O-ring seal 124 is thus encompassed within the term moisture sealant means for the purposes of interpreting claims herein.

The connector 120 can be held to the splice body by means of snaps 122 which interact with snap receptacles 144. Snaps 122 and receptacles 144 form an attachment for attaching the splice housing 110 to the connector 120, with one part of this attachment being on each component. Other attachment mechanisms for attaching the splice housing 110 to the connector 120 are also envisioned, and generally referred to as attachment means for attaching the connector 120 to the splice housing 110. These means may have one part on each of the splice housing 110 and the connector 120 or be entirely on one or the other component. Attachment structure, whether currently known or developed in the future, that serves to connect two separate components together in a secure manner and has structure similar or equivalent to the snaps 122 and receptacles 144 is thus encompassed within the term attachment sealant means for the purposes of interpreting claims herein.

FIG. 7C illustrates the connection between connector receptacles 148a, 148b, 148c and the power bus wires 102. The receptacles 148a, 148b, 148c each define an aperture for receiving a mating electrical pin, e.g., pins 105 of the connector 120 (see FIG. 7B). As shown the receptacles 148a, 148b, 148c define such apertures in a common plane on the same side of the splice housing 110. Receptacle 148c is connected to wires 102 by means of a spring-loaded extension 147 which wraps around wires 102 making an electrical connection to both sides of the wires 102, i.e., a direct contact between the extension 147 and one of the wires 102. To this end, the insulation, typically present around a conductive core of each wire, has been removed in this section of the wire 102 by means of a tool, not shown, or by other means. Receptacle 148c is situated above the wire 102 that it engages with.

Receptacle 148b similarly connects to the other strand of the wire 102 through an extension from the receptacle 148b. The wires 102 are spaced apart from one another in the splice housing 110 (see FIGS. 7C and 7E wherein formation of the two parts of the splice housing 110 to define generally parallel channels for the wires 102 can be seen). Receptacles 148b includes a spring-loaded extension that directly engages with a conductor in one wire 102 and an extension that extends from this wire to the other wire. The receptacle 148b is situated above this other wire.

Receptacle 148a attaches to one end of a wire coil 141 which wraps around toroid 139 through which one of the wires 102 passes (see also FIG. 18). The other end of the winding connects to receptacle 148b as explained below.

By means of the electrical contact of the receptacles 148a, 148b, 148c and wires 102, it becomes possible for the wires 102 to pass through the splice housing 110 without being interrupted yet to provide power or other signal/communications capability to wires extending from the splice housing 110. Receptacles 148a, 148b, 148c may have a unitary structure, i.e., made from or as a single member.

Connector receptacles 148a, 148b, 148c may be considered structure that includes a part or section that defines a female portion of an electrical connection unit, with the male portion of the electrical connection unit being provided by the pins 105. The female portion may include a solid, annular portion having an internal cavity and an opening at one end leading to this cavity, the cavity and opening thereto being dimensioned to accommodate a pin. It is possible to reverse the female and male portions, i.e., provide pins on the structure that contacts the wires 102 or pins attached to the wire coil 141, and then female receptacles on the connector 120. Thus, recitation of a connector receptacle in the claims may be interpreted to include a male component while recitation of a pin in the claims may be interpreted to include a female receptacle.

FIG. 7D illustrates the splice assembly 110 with the connector 120 removed. The mating connector for connector 120 is showing generally at 142. Receptacles for pins 105 are shown at 148 and snap receptacles at 144. Also shown is a channel into which the O-ring seal 124 can penetrate. A portion of the receptacles 148 is exposed to allow for electrical contact between the receptacle 148 and the pins 105 of the connector 120. Although the receptacles 148 are shown in a linear arrangement, other non-linear arrangements for the receptacles 148, and a corresponding arrangement for the pins 105 in the connector 120 are also within the scope of the invention.

Figure 7E:
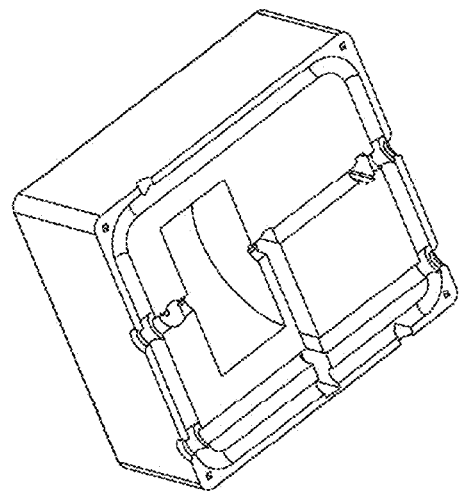
FIG. 7E shows the top half of the assembly of FIG. 7A.

FIG. 7E shows the underside of the upper part of the splice housing including a cavity to receive the toroid 139, and channels through which the receptacles 148a, 148b, 148c extend. The lower part similarly includes a cavity for the receiving the toroid 139. The splice housing 110 has two parts, the upper part shown in FIG. 7E and the lower part shown in FIG. 7C. Channels for the wires 102 to pass through and that define the inlet and outlet of the splice housing 110 for the wires 102 are also shown.

Figure 7F:
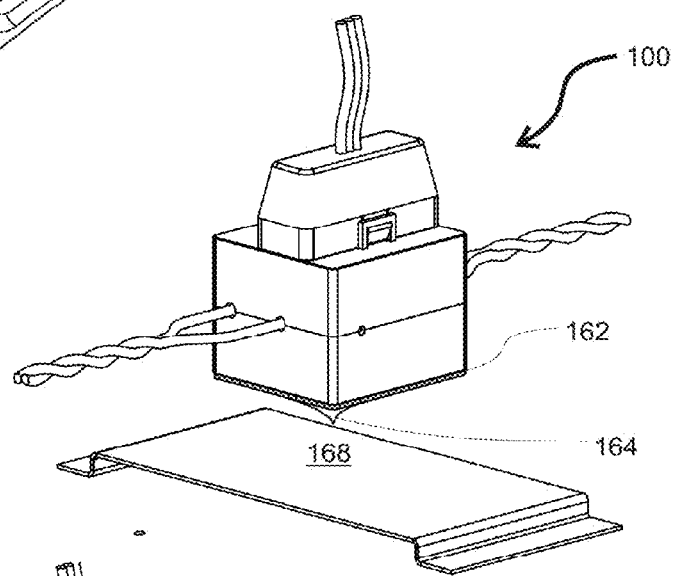
FIG. 7F illustrates one method of attachment to the vehicle.
Figure 7G:
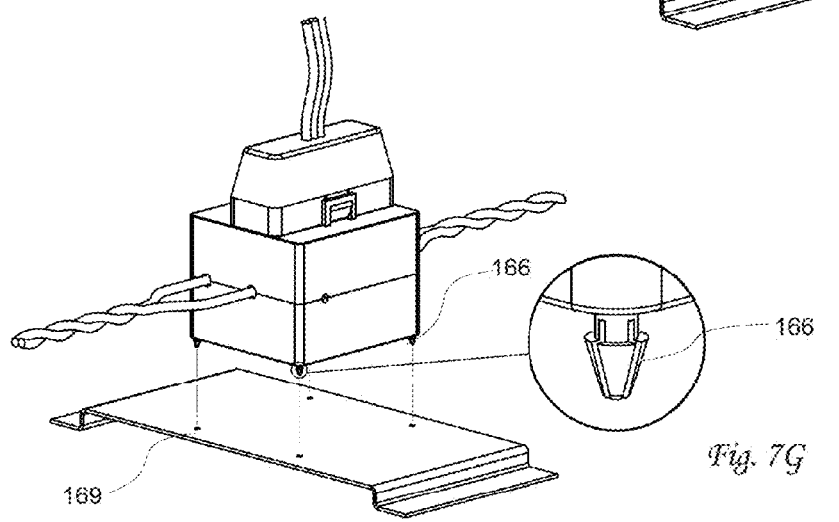
FIG. 7G illustrates an alternate attachment method.

Two methods of attaching the splice to the vehicle are illustrated in FIGS. 7F and 7G. In FIG. 7F, the splice assembly 100 attaches to sheet metal 168 of a vehicle by means of an adhesive back foam pad 162. Prior to assembly, adhesive on foam 162 is protected by a release paper 164, which is removed just before attaching to the sheet metal 168. In FIG. 7G, the attachment is made by tapered molded plastic extensions 166 which engaged with holes 169 in a vehicle surface such as sheet metal 168. The adhesive foam 162 and extensions 166 constitute attachment means for attaching the splice housing 110 to sheet metal 168. The invention is not limited to these attachment means and other attachment mechanisms and structure known to those skilled in the art to which this invention pertains may be used without deviating from the scope and spirit of the invention.

Since all functions of the vehicle are controlled through the data and power bus wires 102, it is important that these wires do not get severed during a crash, for example. Thus, the wires 102 should be stronger than the attachment holding the splice to the vehicle. The foam pad and adhesive designed is calculated to release from the sheet metal 168 at a substantially lower force than would be required to break the wires 102. Similarly, for the plastic extensions 166, these extensions 166 will break at a substantially lower force than required to the wires 102.

Most internal combustion powered automobiles have a barrier wall to protect the passenger compartment from fire and fumes originating in the engine compartment (a "firewall"). The power bus must pass through this firewall without leaving an opening. The power bus can be installed in two sections, one servicing the engine compartment and the other servicing the vehicle behind the firewall 176. FIG. 8A is an illustration showing the male and female connectors allowing the bus 102 to pass through the firewall 176. The female connector is shown generally at 160 and can be on the engine side of the firewall 176. The base of the connector 161 is attached to a connector plate 163 which contains four screws, rivets, or snap attachments for holding the device into the firewall 176. The connector 160 has receptacles 164 for male pins 168 located on the mating connector shown generally at 170. FIG. 8B illustrates the arrangement of the two connectors with a piece of the firewall 176 containing holes 177. The female connector 160 contains a spring-loaded snap mechanism 172 which, when assembled, mates with a snap connector receptacle 174 located on the male connector 170. If attachments 166 are snap attachments, then the assembly of the connectors and firewall 176 involves merely pushing the female connector 160 with the attachment pins 166 aligned with the receiving holes 177 in the firewall 176 onto the firewall 176. Next, the male connector 170 is aligned and pushed such that the snap 172 engages with the firewall 176. Thus, the assembly of the connectors on either side of the firewall 176 is readily accomplished permitting the power bus to pass through the firewall 176 without leaving an opening for fumes or fire to penetrate into the passenger compartment.

FIG. 9A is a schematic illustration of a cluster controlling four devices. In this illustration, cluster 1 controls an array of lights on the front right side of the automobile and similarly cluster 2 controls an array on the front left side of the automobile. A right rear array of lights is controlled by cluster 3 and a left rear array of lights is controlled by cluster 4. These are for illustrative purposes only and many other clusters such as shown in FIG. 5 and FIG. 6 can be connected to the ECU through the power bus. FIG. 9B illustrates a typical cluster 186 which in this case has 7 attached devices or loads, F1-F7. The cluster 186 receives power through connector 100 from wires 102 as described above and receives and sends information inductively through toroids 182, 183. The microprocessor 184 scans all of the information residing on the power bus 102 for ID's which correspond to the loads represented by F1-F7. Each Function Fn has a unique ID code. For high current loads, a heat sink for the power FET is required. Prior to sending significant current to a particular load and on power up, the microprocessor 184 may sense each of the loads and send information to controlling ECU either if a short is detected or if an open circuit indicating, for example, a burned out lightbulb. In the case of a short, the microprocessor 184 will not permit current to be sent to that load and a message indicating the short will be sent to the ECU via wires 102. This replaces the function normally performed by a fuse and thus simplified the wiring system of the vehicle by not requiring fuses. Similarly, if an open circuit is detected for a lightbulb, the ECU is informed that the lightbulb is burned out and needs replacing.

The microprocessor 184 may be configured to only recognize ID's corresponding to the loads F1 to Fn. All commands with other IDs which can provide instructions to other clusters are ignored by this particular cluster. In some cases, touch pad switches 181 can be connected directly to a cluster. This could occur for vehicles where the wireless switching capability has not been installed or where touch switches are provided on the exterior door or trunk of the vehicle. If touch pads are used, the microprocessor 184 sends the request to the ECU which returns the proper command to the Fn unit which may or may not reside on the same cluster. The ECU polls the clusters many times per second. All commands must come through the ECU (see FIG. 9A).

The cluster microprocessor functions are shown in FIGS. 9C-9E. FIG. 9C represents the general operation of a function residing within the microprocessor. FIG. 9D represents a simple on/off function as used for lights, for example. The microprocessor has the capability of generating PW (pulse width) outputs as shown in FIG. 9E. These outputs can be used to control, e.g., speed and torque of a motor. The filter prevents the PW motor current from appearing on the power bus.

The inventive power and information bus permits the use of wireless switches, thus greatly simplifying the wiring structure of a vehicle. An electric field monitoring system is a particularly useful technique for wireless switches especially since it is now in production as an occupant presence and position sensor by Honda Elesys and others. An adaptation of the Honda Elesys system can be used, as illustrated in U.S. Pat. No. 8,725,311 to allow the use of wireless switches.

FIG. 10 is a side view, with parts cutaway and removed of a vehicle 200 showing a passenger compartment 202, or passenger container, containing a driver 204 operating the vehicle 200 and sitting in a seat 206. Embedded in the seat 206 or as part of the seat cover material is an electric field antenna 208. The manner in which the electric field antenna 208 can be embedded in the seat 206 may be by placing the electric field antenna 208 in the cushion material of the seat 206. To make the electric field antenna 208, electrically conductive material may be woven into the material of the seat cover or arranged on the material of the seat cover. Other alternatives include placing a conductive mat in the seat 206 just below the seat cover material or, in some cases, using the seat heating wires as an antenna. There are thus many ways that an area of a seat 206 can be made conductive and to function as an antenna. The design of a particular antenna depends on the wavelength of the signal being emitted and is well understood in the art. Although a single antenna 208 is illustrated, multiple antennas can be used. A second antenna, for example, can be placed in the seat back.

Each of the electric field antennas used can have any appropriate number of individual antennas such as from 1 to about 20 but is illustrated here as being a single antenna. FIG. 10 illustrates an embodiment where a single antenna 208 is placed in the seat bottom.

Each of the antennas is connected to an electronic control unit (ECU) which can be the same ECU as used for the power and data bus, and includes the electric field generating circuits. The ECU includes software and hardware known to those skilled in the art, such as a processor and signal processing circuitry and software embodied on non-transitory computer-readable media to implement the functions described herein. As used herein, a "control unit" will generally mean any component or combination of components that is capable of processing input data and/or signals for an identified purpose, and generating from the data and/or signal processing, commands or signals to be directed to one or more other electronic components to be controlled. A control unit in accordance with the invention may have other functions, e.g., to generate signals to be transmitted via a communications system. Also, as used herein, an "antenna" may be considered any conductive surface that is positioned close to the occupant of the seat 206. Such a conductive surface could be the source from which electric field is transmitted or conveyed to the occupant. An antenna does not have to have any particular geometry, although it would operate in a preferred manner if it were "tuned" to the wavelength that is being transmitted. More detailed description of wireless switches of this invention is illustrated in U.S. patent application Ser. No. 14/932,083 filed Nov. 4, 2015. Also, background for the functioning of electric field occupant sensors is provided in U.S. Pat. Nos. 6,684,973 and 6,960,841 as well as others assigned to Elesys and Honda covering electric field occupant sensing and others assigned to Automotive Technologies International, Inc., (ATI) and to American Vehicular Sciences LLC (AVS) mentioned herein. Whereas Elesys, ATI and AVS primarily use this technology for identifying the occupancy of the passenger seat for the purposes of airbag suppression or depowered deployment, the purpose here is primarily to use the technology in an altogether different manner to transfer power to operate wireless switches.

Figure 11B:
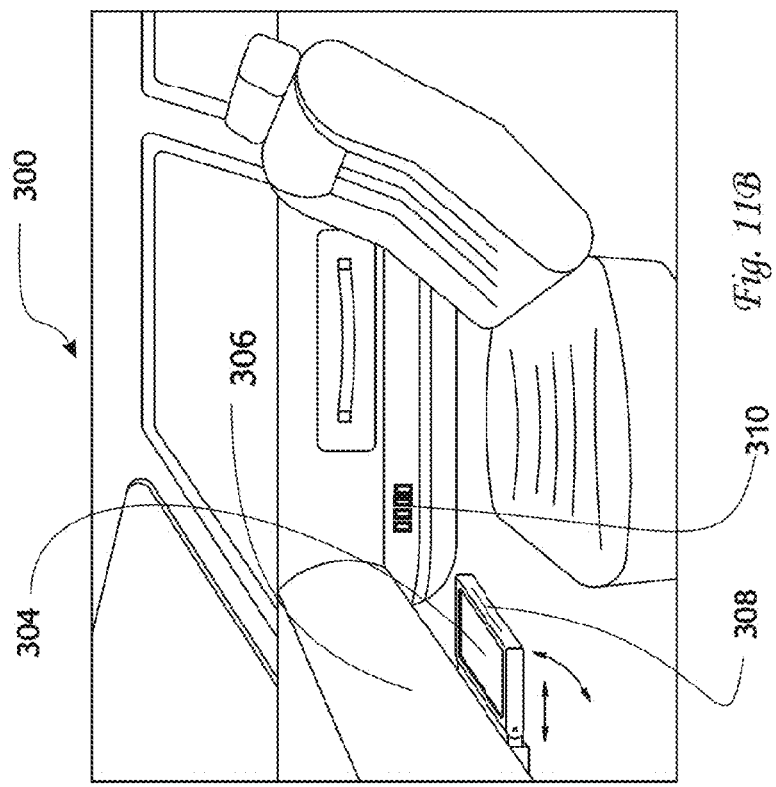
FIGS. 11A and 11B show other interior surfaces where RFID touch pads can be placed such as on the armrest (FIG. 11A) and projecting out of the instrument panel (FIG. 11B).
Figure 11A:
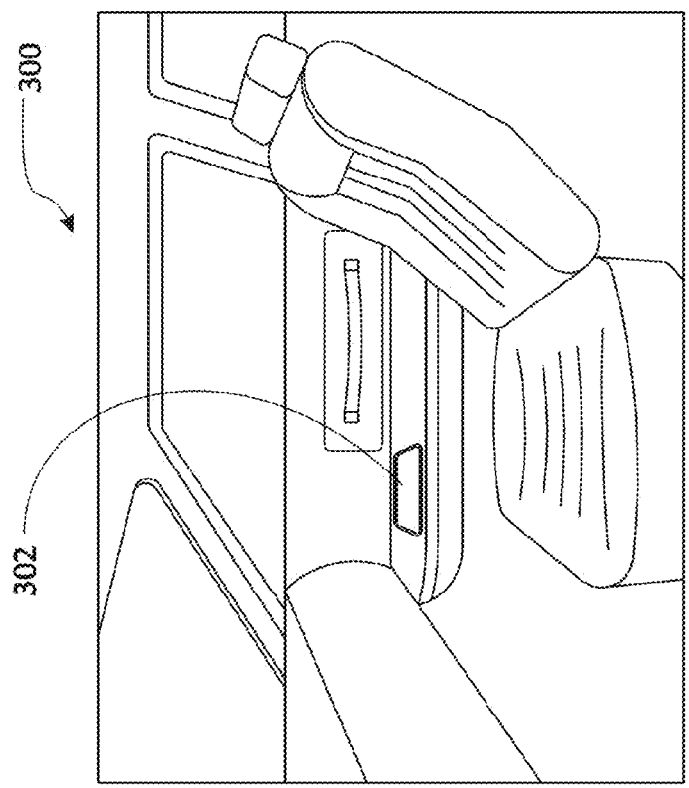

The interior of a passenger vehicle is shown generally at 300 in FIGS. 11A and 11B, which illustrate two of the many alternate positions for touch pads, in this case for the convenience of the passenger. Each touchpad may be part of an electrical circuit and connected to a cluster and define an appropriate surface to be contacted by the occupant to effect control of a vehicular component.

One touch pad 302 is shown mounted on the armrest within easy reach of the right hand of the passenger (FIG. 11A). The second installation 304 is shown projected out from the instrument panel 306. When not in use, this assembly can be stowed in the instrument panel 306 out of sight. When the passenger intends on using the touch pad 304, he or she will pull the assembly including the touch pad 304 by handle 308 bringing the touch pad 304 toward him or her. For prolonged use of the touch pad 304, the passenger can remove the touch pad 304 from the cradle and even stow the cradle back into the instrument panel 306. The touch pad 304 can then be operated from the lap of the passenger and can be used to operate a computer screen which may be projected onto a HUD or be part of the instrument panel. In this case, the communication of the touch pad 304 to the vehicle is done by, e.g., infrared or radio frequency transmission, or by some other convenient wireless method such as the seat mounted antenna system described herein or with wires. In either case, each key on the keyboard can have a separate ID. The touchpads in FIGS. 11A and 11B can derive their power and provide their communication in the same manner as the switches described above. The finger of the occupant can carry power from the antenna in the seat to the touchpad 302 or 304. The commands provided on the touchpads 302 and 304 can be transmitted wirelessly to the vehicle in the same manner as described above. A bank of switches 310 can also be provided mounted in the armrest or elsewhere for wirelessly controlling vehicle complements such as the windows, door locks etc. (see FIG. 11B). Similarly, the ID returned from the keys can go through the body of the passenger and through the ECU, the information can be placed on the power bus.

Figure 12:
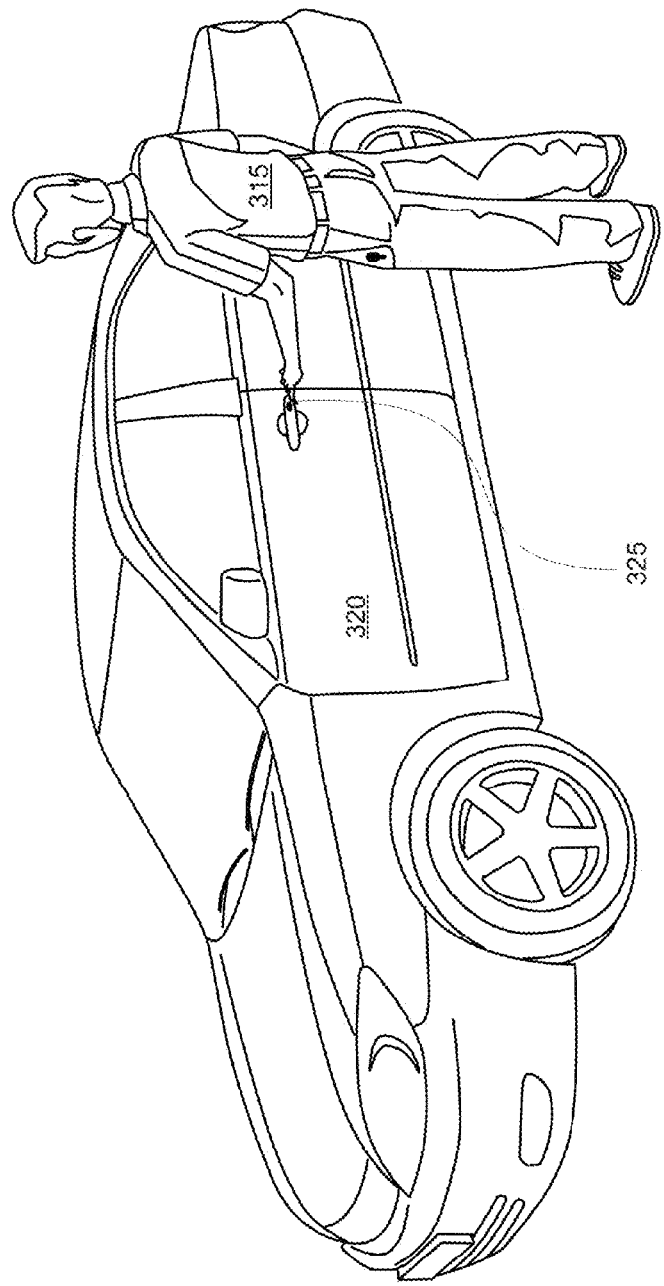
FIG. 12 illustrates a person approaching a vehicle and touching a cluster connected touchpad switch which can lock or unlock the door.

FIG. 12 illustrates a person 315 approaching a vehicle 320 and touching a cluster connected touchpad switch 325 which can lock or unlock the door. Presumably the person desiring entry to the vehicle has been previously identified in a manner discussed below.

Figure 13:
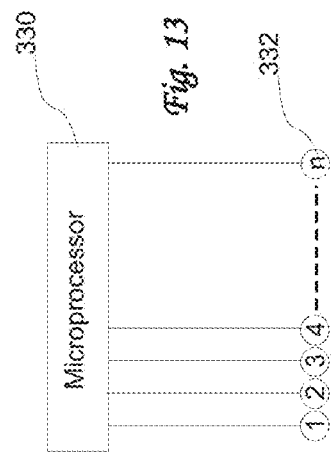
FIG. 13 is a schematic of a group of touchpad switches which can be connected to a cluster or to the power bus.

FIG. 13 illustrates a schematic of a group of touchpad switches which can be connected directly to a cluster or to the power bus. The switches are represented at 332 and the ECU or cluster microprocessor at 330.

Figure 14:
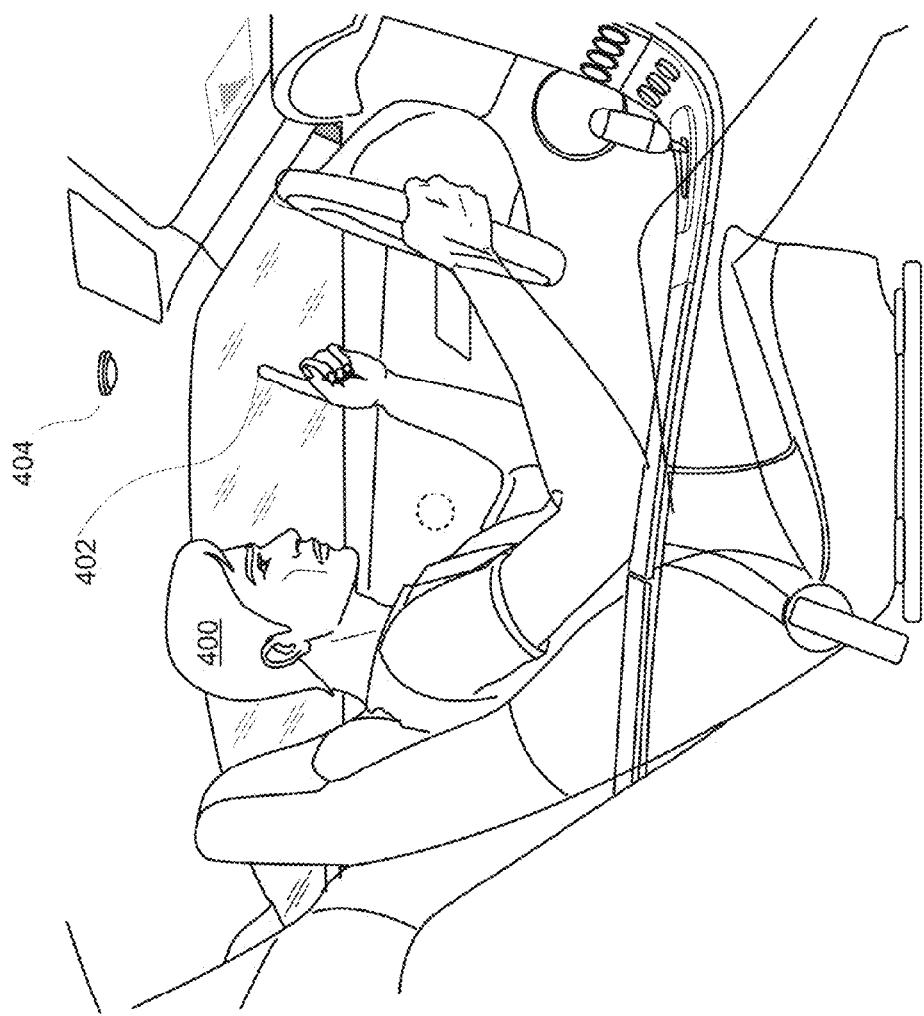
FIG. 14 is an illustration of a HUD display and gesture means of controlling a component.

FIG. 14 illustrates a HUD display (not shown) and gesture means of controlling a vehicular component. A driver 400 is raising his finger 402 in response to a request which appeared on the HUD display or was conveyed orally. A camera 404 mounted in the headliner, or other convenient location, images and interprets through pattern recognition the presence of the raised finger.

Figure 15:
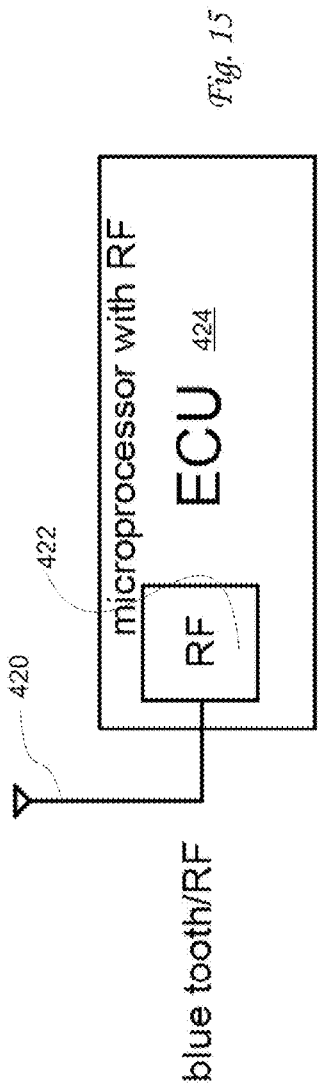
FIG. 15 is a schematic of a Smart phone, internet or key fob activation means for controlling a component.

A schematic of a Smart phone, internet or key fob activation means for controlling a component is illustrated in FIG. 15. The Bluetooth, Wi-Fi, or other RF signal is received by antenna 420 which is fed into an RF section 422 of an ECU or cluster microprocessor 424. This signal may or may not be in response to an interrogation signal sent from the vehicle. By this manner, all of the components in the vehicle can be controlled by any wireless means through the data and power bus ECU.

A block diagram of the power and information bus is illustrated FIG. 16. Although only six clusters 430 are illustrated, as discussed above, a typical installation will consist of many such clusters. The voltage to the system is provided by a battery 438 or other power source. The capacitors at the battery 438 and other ends of the bus short the bus to ground. A capacitor 435 at the battery 438 keeps the control AC current from the battery 438. A capacitor 440 at the end of the bus 433 makes a very low impedance loop for the AC signal. The ECU 432 and the clusters 430 are coupled to the bus 433 through the current transformer and, as described in more detail below, the code from the ECU 432 contains the ID of a function to be performed by one of the clusters and also a code as to what function is to be performed. The clusters 430 can also communicate with each other through the bus and under control of the ECU 432.

A block diagram of the power bus illustrating interaction with a component is shown in FIG. 17. Upon receiving an instruction to activate a load on a cluster, the ECU 432 will create a voltage signal at, for example, 50 kHz. This is converted to a current signal at the toroid 434 of, for example, 1 amp. This current signal is converted back to a voltage signal by another toroid 436 where the cluster microprocessor provides power to the load through a power FET. 50 kHz is used here as an example and a higher frequency may be required depending on the response time requirement of devices on the bus 433. Note that the headlamps may be the largest resistive loads and to reduce the loading of the AC by these lamps, a small inductor can be placed in series with the lamps.

The toroid core 138 shown in FIG. 7C is illustrated in more detail in FIG. 18 generally at 450. This device provides the method of adding and removing data from the power bus. The primary current Ip flows in the wire 102 and the secondary current Is flows in the secondary winding 454. The equations governing the relationship between the current and wire 102 and the current and wire 454 are:

Where phi is flux in core (arrow 456 in core 452)

$$Es = Ns * d(\text{phi})/dt \text{ secondary many turns} \quad (1)$$

$$Ep = Np * d(\text{phi})/dt \text{ primary one turn} \quad (2)$$

$$Es/Ep = Ns/Np \ d(\text{phi})/dt \text{ is same for both windings} \quad (3)$$

$$Es = Ep * Ns/Np \quad (4)$$

$$Ep * Ip = Es * Is \text{ ideal case no losses} \quad (5)$$

$$Es/Ep = Ip/Is \quad (6)$$

$$Ip/Is = Ns/Np \quad (7)$$

$$Ip = Is * Ns \text{ since } Np = 1 \quad (8)$$

$$Ip = 30 * Is \text{ for } Ns = 30 \quad (9)$$

phi=5+0.5*sin(2*Pi*F*t) 5 is flux from DC current.

$$d(\text{phi})/dt = -Pi*F*\cos(2*Pi*F)$$

The transformer does not pass DC (direct Current) from (9) if Ip is 120 ma. Is would be 3.6 amps. (Ideal case 100% coupling) The transformer is bi-directional.

Thus, under ideal coupling, if the current produced by the ECU or cluster microprocessor is 120 ma, the current induced in the power wire 102 is 3.6 amps.

FIG. 19 illustrates how a Hall Effect sensor 464 shown generally at 460 can be used in place of the transformer. The circuit includes an amplifier 466, filter 468 and microprocessor 470. A Hall sensor can only be used to retrieve data from the power bus and not to add data thereto.

Figure 20:
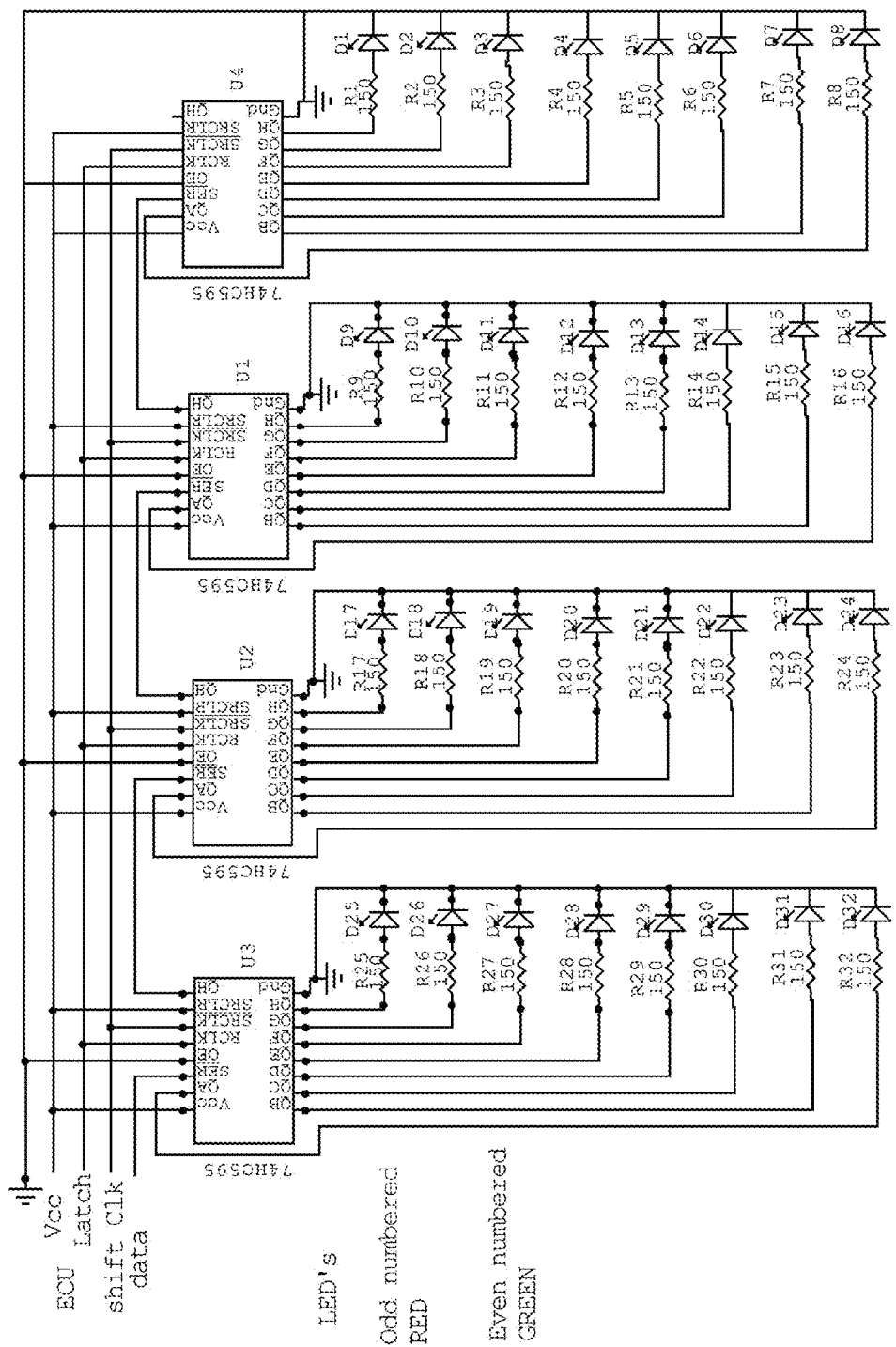
FIG. 20 is a schematic illustrating a display which can be used to visually monitor actions of an ECU.

FIG. 20 is a schematic illustrating a display which can be used to visually monitor the actions of the ECU and will be understood by those skilled in the art. Other display schemes can be used without departing from the scope of this invention.

Figure 21:
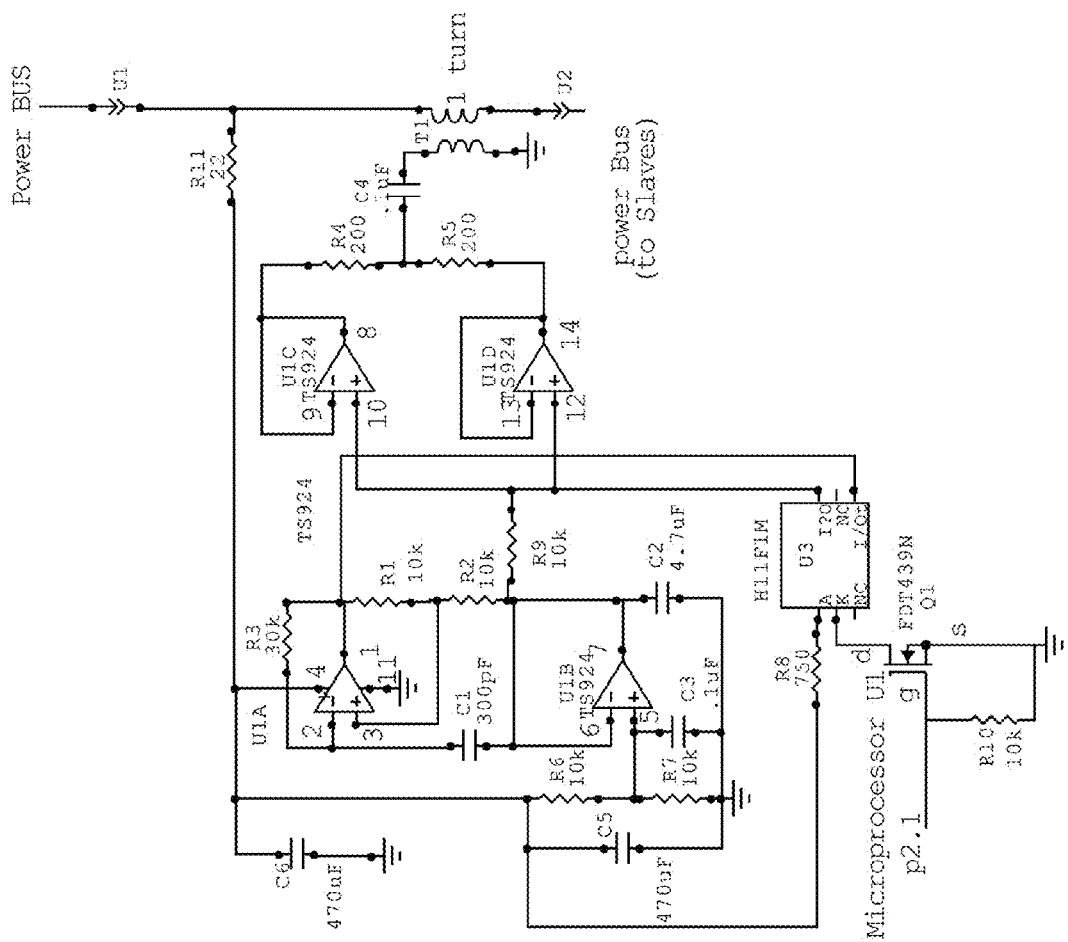
FIG. 21 is a schematic illustrating the manner in which information is placed on and retrieved from a power bus.

FIG. 21 is a schematic illustrating one manner in which information is placed on and retrieved from the power bus and will be understood by those skilled in the art. Other information transfer schemes can be used without departing from the scope of this invention.

Figure 22:
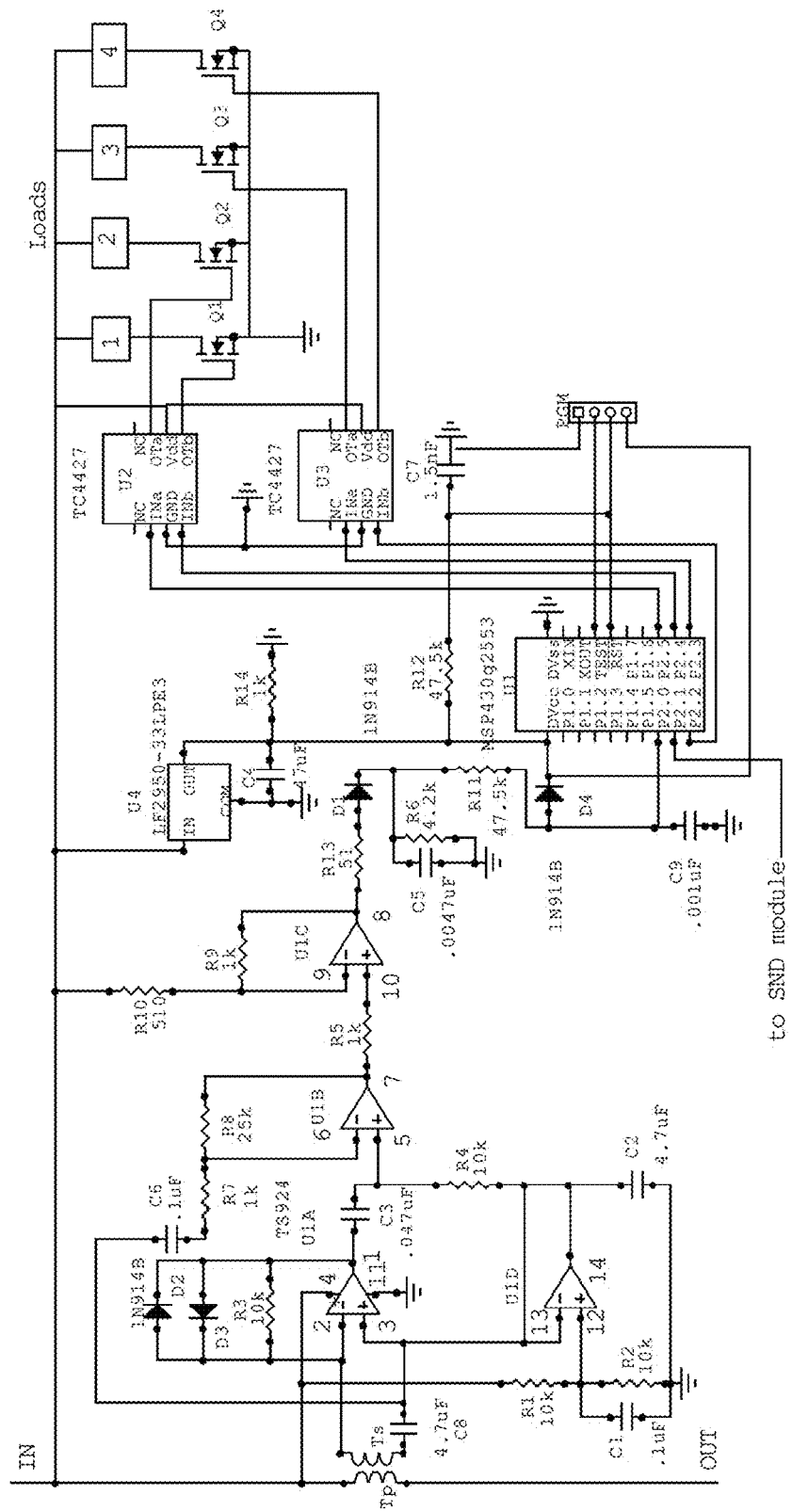
FIG. 22 is a schematic illustrating four loads placed on the power bus.

FIG. 22 is a schematic illustrating four loads placed on the power bus and will be understood by those skilled in the art. Other load placement schemes can be used without departing from the scope of this invention.

Figure 23:
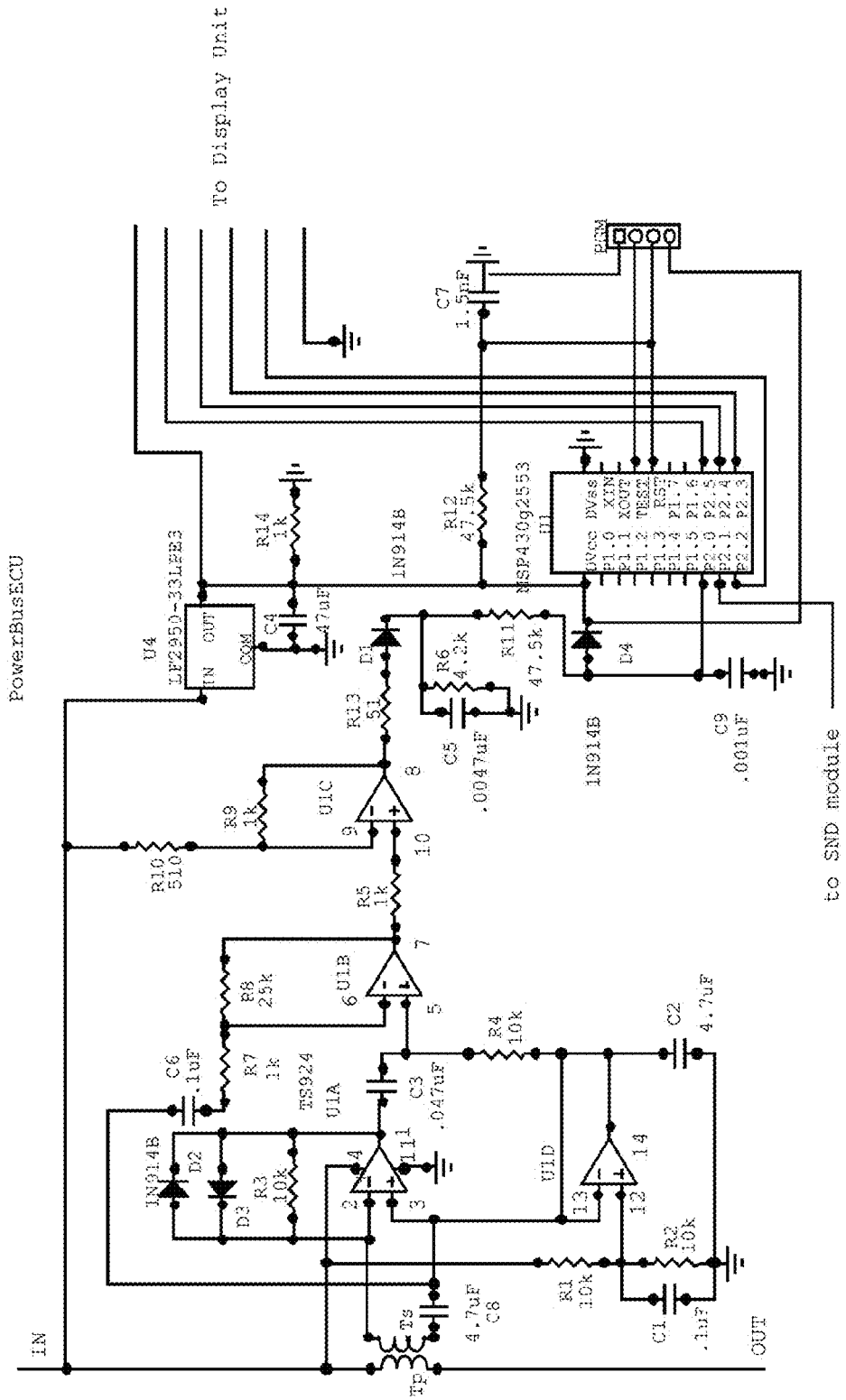
FIG. 23 is a schematic of the power bus ECU.

FIG. 23 is a schematic of the power bus ECU and will be understood by those skilled in the art. Other power bus ECU schemes can be used without departing from the scope of this invention.

As discussed in various U.S. patents, such as U.S. Pat Nos. 6,326,704, 7,079,450, 7,889,096, 7,760,080, 7,089,099, 7,880,594, 7,786,864, 7,920,102, 7,467,034, 8,068,942 and 8,032,264, wires and connectors are not only expensive components to make and install in a vehicle, they are also the largest source of warranty repairs. Thus, there is a dire need to eliminate wires and connectors wherever possible. Many of these wires can be eliminated through use of electric field systems such as the Honda Elesys electric field occupant sensor discussed elsewhere herein. This invention using electric fields can be implemented in many ways, only one of which has been discussed here. See U.S. Pat. No. 8,725,311 and U.S. patent application Ser. No. 14/932,083 filed Nov. 4, 2015, published as US20160137148, for further discussion and alternate implementations.

In one preferred embodiment, the 12-volt, or other voltage, power distribution network also serves as the information network. It can be a time multiplex network, meaning that data sent from one node to another is multiplexed in the time domain rather than the frequency domain. In the extreme case of this network, only a single wire is required with the return, or ground, taking place through the vehicle sheet metal and/or chassis. All sensors, switches and actuators become active devices on the network. Either special chips or low cost microprocessors are used for the coding and decoding on the data at each device. These can be combined in a cluster module when the devices managed are in close proximity to one another. One such cluster module can service all devices which are located in a door, for example, another for the instrument panel, another for the engine, etc.

Under one preferred design, the network protocol permits critical devices to grab the network when needed, however, the network bandwidth is chosen so that this is not necessary, except in specific situations that may be determined by the installer of the system, such as perhaps when the vehicle is experiencing a crash. Either coaxial cable or twisted wires can be used, with twisted wire being a preferred design.

Benefits derived from the inventive vehicle electrical system include at least at 50% cost saving when fully implemented compared with current wire harnesses. A weight savings of at least 50% is also expected. Most importantly, a multi-fold improvement in reliability results. The assembly into the vehicle is greatly simplified as is the repair in the event that there is a failure in the wiring harness. Most of the connectors are eliminated and the remaining ones are considerably more reliable. Diagnostics on all devices on key-on can now be accomplished over the network with a single connection from the diagnostic circuit. For example, it will now be easy to detect burnt out lights, loose devices, shorts, disconnects, etc. without the need for fuses. Except for the main vehicle fuse, all fuses for devices on the bus can be eliminated as the processor in each cluster controller can check for a short or open circuit and report that information to an electronic control unit (ECU) for correction. Therefore, fuses are not replaced, instead the device or circuit is replaced after the problem is located. In contrast to other multiplexing systems based on zone modules, the communication from and to each device in the instant invention is bi-directional.

It is now believed that for side impacts, the airbag crash sensor should be placed in the door. There is reluctance to do so by the automobile manufacturers since in a crash into the A-pillar of the vehicle, for example, the wires leading to and from the door may be severed before the crash sensor activates. By using the two-wire network as described herein, only two wires will pass from the door into the A-pillar instead of the typically fifty or more wires. In this case, the wires can be protected so that they are stronger than the vehicle metal and therefore will not sever during the early stages of the accident and thus the door-mounted sensor can now communicate with the airbag in the seat, for example, during a crash into the A-Pillar.

In a preferred system, the power line or distribution network in the vehicle is used to simultaneously carry both power and data to all switches, sensors, lights, motors, actuators and all other electrical and electronic devices (hereinafter called devices) within the vehicle with the exception of wireless switches disclosed in co-pending U.S. patent application Ser. No. 14/932,083 filed Nov. 4, 2015. The same system will also work for vehicles having different voltages such as 48 volts. Also a subset of all vehicle devices can be on a separate network. Initially, for example, an automotive manufacturer may elect to use the system of this invention for the automobile safety system and later expand it to include other devices. The data, in digital form, is carried on a carrier frequency, or as pulse data as in the Ethernet or CAN protocols, and is separated at each device or cluster using a microprocessor. Each device will have a unique, individualized address and be capable of responding to a message sent with its address. A standard protocol will be implemented such as SAE J1850 or ISO 11898-1 through 6 where applicable. The return can be through vehicle ground comprising the vehicle sheet metal and/or chassis or through a wire in the 2 wire twisted pair implementation.

Advantages of this system are numerous, among which the following should be mentioned:

1. The amount of wire in the vehicle will be substantially reduced. There is currently about 500 or more meters of wire in a typical automotive vehicle;

2. The number and complexity of connectors will be substantially reduced. There are currently typically about 1000 pin connections in a vehicle. When disconnection is not required, a sealed permanent connector will be used to join wires in, for example, a T connection referred to as a splice. On the other hand, when disconnection is required, a single or dual conductor connector is all that is required and the same connector can be used throughout the vehicle. Thus, there will be only one or two universal connector designs on the vehicle.

3. The number of electronic modules will be substantially reduced and may even be completely eliminated. Since each cluster will have its own microprocessor, zone modules, for example, will be unnecessary.

4. Installation in the vehicle will be substantially easier since a single conductor pair, with an occasional branch where required, will replace the multi-conductor wire harnesses currently used. Wire "choke points" will be eliminated.

5. Reliability will be increased based on system simplicity.

6. Two way or bi-directional communication is enabled between all devices. This simplifies OBD2 (On Board Diagnostic Level 2 now required by the U.S. Government for pollution control) installation, for example.

7. All devices on the vehicle are diagnosed on key-on. The driver may be visually and/or audibly notified of all burned out lamps and shorts, for example, before he or she starts the vehicle.

8. Devices can be located at optimum places. A side impact sensor can be placed within the vehicle door and still communicate with an airbag module located in the seat, for example, with high reliability and without installation of separate wiring Minimally, only a single or dual wire is required to connect all of the switches, sensors, actuators and other devices in the vehicle door with the remainder of the vehicle electrical system.

9. Electro-magnet interference (EMI) problems are eliminated. The driver airbag system, for example can have the final circuit that deploys the airbag located inside the airbag module and activated when the proper addressed signal is received. Such a circuit would have an address recognition as well as diagnostic capabilities and might be known as a "smart inflator". EMI, which can now cause an inadvertent airbag deployment, ceases to be a problem.

10. Vehicle repair is simplified and made more reliable.

It is important that the wire be designed so that it will not break even in an accident since if the single bus breaks, the results can be catastrophic. Additionally, the main bus wire, or pair of wires, can be in the form of a loop around the vehicle with each device receiving its messages either directly or through a cluster from either direction such that a single major break can be tolerated. Alternately, a tree or other convenient structure can be used and configured so that at most, a single branch of the network is disabled.

It should be understood that with all devices having access to the network, there is an issue of what happens if many devices are attempting to transmit data and a critical event occurs, such as a crash of the vehicle, where time is critical, i.e., will the deployment of an airbag be delayed by this process. In the design disclosed herein, all devices must request permission from a command or central ECU before they transmit data onto the bus. Although normally there is sufficient bandwidth to handle all requirements, it may be desirable to turnoff communication with door-mounted speakers if a crash in occurring so that the audio data will not interfere with the crash sensor acceleration data. The devices will be assigned priorities. A crash sensor, for example, knows that a crash is in progress before it determines that the crash severity requires airbag deployment. That information can then be used to allocate shut down data transmissions from all less critical devices.

Another issue of concern is the impact of vehicle noise on the network. In this regard, since every device will be capable of bi-directional communication, standard error checking and correction algorithms can be employed. Each device is designed to acknowledge receipt of a communication or the communication will be sent again until such time as receipt thereof by the device is acknowledged. Calculations show that the bandwidth available on a single or dual conductor is orders of magnitude greater than required to carry all of the foreseeable communication required within an automobile. Thus, many communication failures can be tolerated.

Still another issue relates to the effect of moisture in view of the single or dual wire system, since moisture can travel from a breach of the installation to everywhere within the vehicle. To control the moisture, the wire can be surrounded by a sealant that is flexible but does not permit the wicking of moisture. This sealant, which has been especially developed for automotive applications, is similar to the sealant used to coat underground telephone cables.

Thus, one embodiment of the vehicle electrical system in accordance with the invention includes a plurality of electrical devices used in the operation of the vehicle, and a single power and communication bus, with all of the devices being connected to this bus. The devices are preferably provided with individual device addresses such that each device will respond only to its device address. Each bus may comprise a pair of wires connected to all of the devices. The devices are, e.g., actuators, sensors, lights and switches as well as, if desired, all of the data gathering apparatus now used in CAN bus implementations. If each device is assigned a unique address, the bus may be arranged to transfer data in the form of messages each having an address of a respective device such that only the respective device assigned to that address is responsive to the message having the address. Each device thus includes means for determining whether the messages of the communication bus include the address assigned to the device. The communication bus may also simultaneously carry data based on the CAN or other appropriate protocol, e.g., one currently in use in the automotive industry, without interfering with the control of various vehicular devices. Each device may be configured to acknowledge receipt of a communication and indicate operability of the device upon ignition of the vehicle.

With a single pair of wires in a twisted pair or coaxial configuration for the communication and power bus, the connector problem can now be addressed because a single design can be used for all connections on the bus and each connector will only be connecting at most two wires. A great deal of effort can thus be applied to substantially improve the reliability of such a connector. The connector which permits passage of the bus through the firewall may be of a different design that the connectors which connect the clusters to the bus through the splice.

An embodiment of this invention relating to switches includes a vehicle including a seat on which an occupant sits during use of the vehicle, and a system for using the occupant in the seat to convey or otherwise provide energy emanating from an antenna in the seat to operate an electrical circuit such as an RFID device. The system includes at least one electric field antenna emitting radio frequency radiation from the seat which passes through or is conducted by the body of the occupant to provide energy to operate the desired electrical circuit when a conductive surface forming part of the electrical circuit is touched by the occupant.

For this embodiment, each vehicle seat contains a set of antennas, each set including at least one antenna and more likely a plurality of antennas. The antennas are electrically attached to control and driving circuitry which causes the antenna set to emit waves at one or more radio frequencies directed toward the occupant's body, which in turn, transmits the RF waves throughout the body and into the occupant's fingers. When the occupant desires to activate a vehicle component, such as to open a window for example, he or she touches a surface on an electronic or electrical circuit, such as an RFID device or transponder, and the occupant's finger provides the power in the form of the RF signal which is rectified to operate the RFID device. The RFID device can then emit a wireless signal carrying its identification message. A receiver located at a convenient location in the vehicle receives the RFID-emitted wireless signal and causes the vehicle component to perform the desired function such as opening the window. Alternative to the RF receiver, the RFID signal is carried back though the occupant's body to an ECU located in the seat. This invention, as discussed in more detail in co-pending U.S. patent application Ser. No. 14/932,083 filed Nov. 4, 2015 mentioned above, can be used to eliminate most if not all wires to switches in the vehicle thereby eliminating much of the vehicle wiring and reducing the cost and weight of the vehicle and increasing its reliability. Since all electrically-activated components in the vehicle require electricity to operate, the command to open a window, for example, can be transmitted from the controller either through a vehicle power and communications bus, wirelessly or in any other convenient manner Preferred embodiments of the invention are described above and unless specifically noted, it is the applicant's intention that the words and phrases in the specification and claims be given the ordinary and accustomed meaning to those of ordinary skill in the applicable art(s). If the applicant intends any other meaning, they will specifically state they are applying a special meaning to a word or phrase.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. An electrical system for a vehicle that provides power and communications to vehicular devices, comprising:
    an electrical bus comprising a plurality of elongate wires;
    a plurality of connector assemblies situated at different locations along said wires, each of said connector assemblies including
        a splice housing defining an inlet for said wires and an outlet for said wires and said wires passing from said inlet to said outlet through said splice housing without being interrupted or terminated in said splice housing,
        at least one electrically conductive unit arranged in said splice housing, each of said at least one electrically conductive unit having a first portion in contact with a respective one of said wires and a second portion exposed to an exterior of said splice housing, and
        a connector attached to said splice housing and electrically connected to said second exposed portion of said at least one electrically conductive unit,
    a respective electrical conduit attached at one end region to each connector of said connector assemblies; and
    a respective cluster control unit attached to an opposite end region of each of said electrical conduits, each of said cluster control units being electrically coupled to a plurality of the vehicular devices which are assigned unique identification codes,
    each cluster control unit including a microprocessor that determines whether signals on said bus are directed to one of the plurality of vehicular devices coupled to said cluster control unit by recognizing an identification code including in the signals and assigned to one of the vehicular devices coupled to said cluster control unit, and
    said microprocessor only directing signals from said bus to one of the plurality of vehicular devices coupled to said cluster control unit in which said microprocessor is included when said microprocessor determines that signals on said bus are directed to that one of the plurality of vehicular devices coupled to said cluster control unit,
    whereby at least one of power and communications are provided to the vehicular devices by a power source and communications source connected to said bus.

2. The system of claim 1, wherein said connector is removably attached to said splice housing and said connector comprises at least one pin each electrically connected to a respective one of said at least one electrically conductive unit.

3. The system of claim 2, wherein said electrical conduit comprises at least one wire each electrically coupled to a respective one of said at least one pin.

4. The system of claim 2, further comprising moisture sealant means arranged around said at least one pin to protect an engagement area of said at least one pin and said at least electrically conductive member in said splice housing from moisture intrusion.

5. The system of claim 1, wherein said connector is removably attached to said splice housing and said at least one electrically conductive unit comprises a plurality of electrically conductive units and said connector comprises a plurality of pins each electrically connected to a respective one of said plurality of electrically conductive units when said connector is attached to said splice housing.

6. The system of claim 5, wherein said electrical conduit comprises a plurality of wires each electrically coupled to a respective one of said plurality of pins.

7. The system of claim 5, wherein said pins are in a linear arrangement in said splice housing.

8. The system of claim 1, further comprising attachment means for attaching said connector to said splice housing, said attachment means comprising a first attachment component on said splice housing and a second attachment component on said connector that engages with said first attachment component.

9. The system of claim 1, wherein said connector is removably attached to said splice housing and said second portion of at least one electrically conductive unit comprises at least one electrical receptacle, each of said at least one receptacle defining an aperture that receives a mating electrical pin.

10. The system of claim 9, wherein said connector comprises a number of electrical pins equal in number to said at least one electrical receptacle and each of said electrical pins mating with a respective one of said at least one electrical receptacle, said electrical conduit at least one wire each electrically coupled to a respective one of said number of electrical pins.

11. The system of claim 9, wherein said at least one electrically conductive unit further comprises a spring-loaded extension that directly engages with a conductor in one of said wires and is situated above said one of said wires.

12. The system of claim 9, wherein said wires are spaced apart from one another in said splice housing, and said at least one electrically conductive unit further comprises a spring-loaded extension that directly engages with a conductor in a first one of said wires and an extension that extends from said first wire to a second one of said wires, said at least one electrical receptacle being situated above said second wire.

13. The system of claim 9, wherein said wires are spaced apart from one another in said splice housing, further comprising a toroid around one of said wires, and a wire coil that wraps around said toroid, said at least one electrical receptacle being attached to said wire coil.

14. The system of claim 1, wherein said wires are spaced apart from one another in said splice housing, further comprising a toroid around one of said wires, a wire coil that wraps around said toroid, and at least one electrical receptacle attached to said wire coil, each of said at least one electrical receptacle defining an aperture that receives a mating electrical pin.

15. The system of claim 14, wherein said at least one electrical receptacle attached to said wire coil comprises a first electrical receptacle connected to a first end of said wire coil and a second electrical receptacle attached to a second end of said wire coil.

16. The system of claim 14, wherein said splice housing comprises first and second parts, each of said first and second parts defining a cavity that receives said toroid.

17. The system of claim 1, wherein said splice housing comprises first and second parts, each of said first and second parts defining a plurality of channels into which said wires are received.

18. The system of claim 17, wherein said plurality of channels are parallel to one another.

19. The system of claim 17, wherein said at least one electrically conductive unit has a unitary structure.

20. An electrical system for a vehicle that provides power and communications to vehicular devices, comprising:
 an electrical bus comprising a plurality of elongate wires;
 a plurality of connector assemblies situated at different locations along said wires, each of said connector assemblies including
  a splice housing defining an inlet for said wires and an outlet for said wires and said wires passing from said inlet to said outlet through said splice housing without being interrupted or terminated in said splice housing,
  at least one electrically conductive unit arranged in said splice housing, each of said at least one electrically conductive unit comprising at least one electrical receptacle defining an aperture that receives a mating electrical pin, said aperture being exposed to an exterior of said splice housing, and
  a connector removably attached to said splice housing and comprising at least one pin each received in a respective one of said at least one receptacle when said connector is attached to said splice housing,
 a respective electrical conduit attached at one end region to each connector of said connector assemblies; and
 a respective cluster control unit attached to an opposite end region of each of said electrical conduits, each of said cluster control units being electrically coupled to a plurality of the vehicular devices which are assigned unique identification codes,
each cluster control unit including a microprocessor that determines whether signals on said bus are directed to one of the plurality of vehicular devices coupled to said cluster control unit by recognizing an identification code included in the signals and assigned to one of the vehicular devices coupled to said cluster control unit, and
said microprocessor only directing signals from said bus to one of the plurality of vehicular devices coupled to said cluster control unit in which said microprocessor is included when said microprocessor determines that signals on said bus are directed to that one of the plurality of vehicular devices coupled to said cluster control unit,
whereby at least one of power and communications are provided to the vehicular devices by a power source and communications source connected to said bus.

* * * * *